United States Patent
Clark et al.

(10) Patent No.: US 11,250,200 B2
(45) Date of Patent: Feb. 15, 2022

(54) SYSTEMS AND METHODS FOR GENERATING DIGITAL LAYOUTS WITH FEATURE-BASED FORMATTING

(71) Applicant: SHOPIFY INC., Ottawa (CA)

(72) Inventors: Kevin Clark, Terrebonne (CA); Natalie Hercun, Montreal (CA)

(73) Assignee: SHOPIFY INC., Ottawa (CA)

( * ) Notice: Subject to any disclaimer, the term of this patent is extended or adjusted under 35 U.S.C. 154(b) by 0 days.

(21) Appl. No.: 16/819,702

(22) Filed: Mar. 16, 2020

(65) Prior Publication Data
US 2021/0286930 A1    Sep. 16, 2021

(51) Int. Cl.
| | |
|---|---|
| *G06F 40/103* | (2020.01) |
| *G06F 16/957* | (2019.01) |
| *G06F 9/451* | (2018.01) |
| *G06F 40/186* | (2020.01) |

(52) U.S. Cl.
CPC ............ *G06F 40/103* (2020.01); *G06F 9/451* (2018.02); *G06F 16/9577* (2019.01); *G06F 40/186* (2020.01)

(58) Field of Classification Search
CPC .... G06F 40/103; G06F 9/451; G06F 16/9577; G06F 40/186
See application file for complete search history.

(56) References Cited

U.S. PATENT DOCUMENTS

| | | | |
|---|---|---|---|
| 7,890,882 B1* | 2/2011 | Nelson | G06F 3/0481 715/788 |
| 9,785,623 B2* | 10/2017 | Leventhal | G06F 40/106 |
| 10,061,760 B2* | 8/2018 | Brant | G06F 40/131 |
| 10,108,694 B1* | 10/2018 | Moody | G06F 16/24578 |
| 2005/0131932 A1* | 6/2005 | Weare | G06F 16/355 |
| 2007/0118797 A1* | 5/2007 | Layzell | G06F 40/103 715/234 |
| 2007/0288843 A1* | 12/2007 | Makino | G06F 40/106 715/243 |
| 2012/0054600 A1* | 3/2012 | McCurdy | G06F 16/5866 715/243 |
| 2015/0310124 A1* | 10/2015 | Ben-Aharon | G06F 40/106 715/205 |
| 2019/0130873 A1* | 5/2019 | Shaw | G06F 40/106 |

FOREIGN PATENT DOCUMENTS

EP        1679625 A2 *   7/2006   ............. G06F 16/84

* cited by examiner

*Primary Examiner* — Michael Roswell

(57) ABSTRACT

Digital layouts that are generated using a pre-defined format can be difficult for users to parse and understand. According to an aspect of the present disclosure, digital layouts are generated using formats that are dynamically determined based on the features in the digital layout. In an embodiment, a plurality of features are received, where each of the features correspond to a respective section of a plurality of sections for a digital layout. Based on the plurality of features, an association between two sections in the plurality of sections is detected. The digital layout is then generated using a format to affiliate the two sections. This digital layout could be an email or a webpage to be displayed on a user interface.

24 Claims, 9 Drawing Sheets

FIG. 2

SYSTEMS AND METHODS FOR GENERATING DIGITAL LAYOUTS WITH FEATURE-BASED FORMATTING

FIELD

The present application relates to digital layouts, and in particular embodiments, to the generation of digital layouts.

BACKGROUND

Digital layouts, including emails and webpages, are used to present content to users on graphical user interfaces. In some cases, digital layouts are divided into multiple sections, where each section can include content and a visual appearance. A user may select or provide the content and appearance for each section of a digital layout. A computer-implemented system can then be used to quickly generate the final digital layout according to a pre-defined format. However, pre-defined formats fail to account for possible relationships between different sections of a digital layout.

SUMMARY

In some embodiments, a computer-implemented system is used to generate a digital layout using a format that is dynamically determined based on the features of the digital layout. These features can include the content and/or the appearance of different sections in the digital layout. If the features in two or more sections are determined to be related to each other, then the digital layout is formatted to affiliate these sections. If the features in two or more sections are not related to each other, then the digital layout is formatted to distinguish between these sections. In contrast, conventional computer-implemented systems for generating digital layouts lack the ability to detect relationships in the features of a digital layout and format the digital layout accordingly.

According to one aspect of the present disclosure, there is provided a computer implemented method. The method includes receiving a plurality of features, each of the plurality of features corresponding to a respective section of a plurality of sections for a digital layout to be displayed on a user interface. The method also includes detecting, based on the plurality of features, an association between a first section and a second section in the plurality of sections. The method further includes generating the digital layout using a format to affiliate the first section with the second section.

In some embodiments, the first section is adjacent to the second section in the digital layout, and generating the digital layout using the format to affiliate the first section with the second section includes generating the digital layout using the format to reduce the spacing between the first section and the second section compared to a pre-defined spacing.

In some embodiments, the method further includes detecting no association between a third section and a fourth section in the plurality of sections. In these embodiments, the third section is adjacent to the fourth section in the digital layout, and generating the digital layout using the format to affiliate the first section with the second section includes generating the digital layout using the format to increase the spacing between the third section and the fourth section compared to a pre-defined spacing.

In some embodiments, detecting the association includes: comparing a first feature of the first section to a second feature of the second section; and determining, based on the comparing, the association between the first section and the second section.

In some embodiments, the first feature includes first content and the second feature includes second content, and determining the association includes determining that the first content is related to the second content.

In some embodiments, the first content and the second content each include at least one of respective text, a respective image and a respective action element.

In some embodiments, the first content includes text having a keyword, the second content includes an action element for accessing a webpage, and determining that the first content is related to the second content includes determining that the webpage includes the keyword.

In some embodiments, detecting the association further includes: determining that, in the digital layout, a third section in the plurality of sections is interposed between the first section and the second section; and determining that the association is between the first section, the second section and the third section. In these embodiments, generating the digital layout using the format includes generating the digital layout using the format to affiliate the first section and the second section with the third section.

In some embodiments, the first feature includes a first appearance and the second feature includes a second appearance, and determining the association includes determining that the first appearance is related to the second appearance.

In some embodiments, the first appearance and the second appearance each include at least one of a respective background color and a respective font.

In some embodiments, the association is a first association, and the method further includes: detecting, based on the plurality of features, a second association between a third section and a fourth section in the plurality of sections; and generating the digital layout using the format to affiliate the third section with the fourth section.

In some embodiments, the digital layout is for an email or a webpage.

According to another aspect of the present disclosure, there is provided a system including a memory to store information, and one or more processors to perform any method as disclosed herein.

BRIEF DESCRIPTION OF THE DRAWINGS

Embodiments will be described, by way of example only, with reference to the accompanying figures wherein:

FIG. 2 is an example of a home page of an administrator, according to one embodiment;

DETAILED DESCRIPTION

For illustrative purposes, specific example embodiments will now be explained in greater detail below in conjunction with the figures.
Example E-Commerce Platform In some embodiments, the methods disclosed herein may be performed on or in association with a commerce platform, which will be referred to herein as an e-commerce platform. Therefore, an example of an e-commerce platform will be described.

Figure 1:
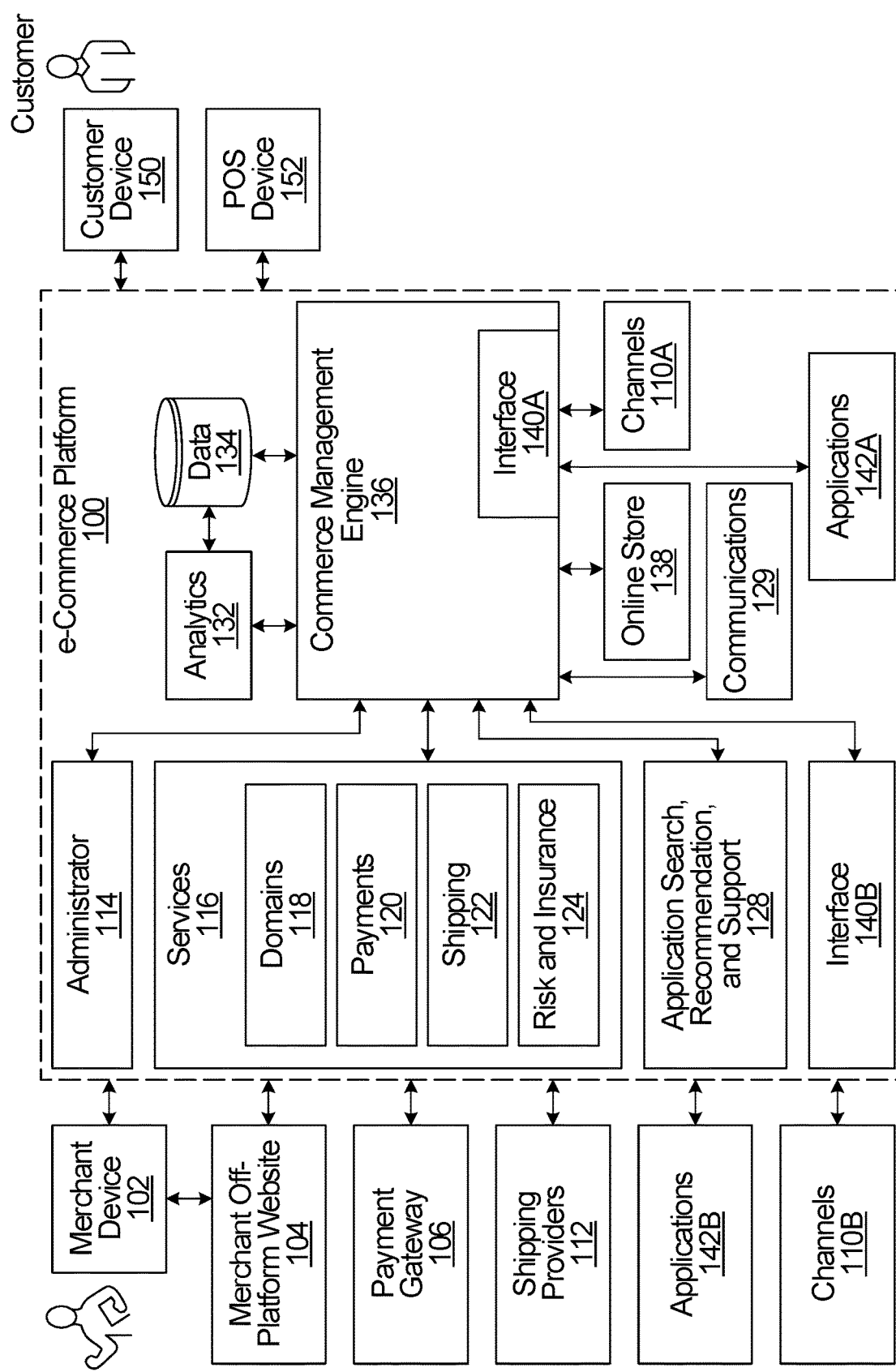
FIG. 1 is a block diagram of an e-commerce platform, according to one embodiment.

FIG. 1 illustrates an e-commerce platform 100, according to one embodiment. The e-commerce platform 100 may be used to provide merchant products and services to customers. While the disclosure contemplates using the apparatus, system, and process to purchase products and services, for simplicity the description herein will refer to products. All references to products throughout this disclosure should also be understood to be references to products and/or services, including physical products, digital content, tickets, subscriptions, services to be provided, and the like.

While the disclosure throughout contemplates that a 'merchant' and a 'customer' may be more than individuals, for simplicity the description herein may generally refer to merchants and customers as such. All references to merchants and customers throughout this disclosure should also be understood to be references to groups of individuals, companies, corporations, computing entities, and the like, and may represent for-profit or not-for-profit exchange of products. Further, while the disclosure throughout refers to 'merchants' and 'customers', and describes their roles as such, the e-commerce platform 100 should be understood to more generally support users in an e-commerce environment, and all references to merchants and customers throughout this disclosure should also be understood to be references to users, such as where a user is a merchant-user (e.g., a seller, retailer, wholesaler, or provider of products), a customer-user (e.g., a buyer, purchase agent, or user of products), a prospective user (e.g., a user browsing and not yet committed to a purchase, a user evaluating the e-commerce platform 100 for potential use in marketing and selling products, and the like), a service provider user (e.g., a shipping provider 112, a financial provider, and the like), a company or corporate user (e.g., a company representative for purchase, sales, or use of products; an enterprise user; a customer relations or customer management agent, and the like), an information technology user, a computing entity user (e.g., a computing bot for purchase, sales, or use of products), and the like.

The e-commerce platform 100 may provide a centralized system for providing merchants with online resources and facilities for managing their business. The facilities described herein may be deployed in part or in whole through a machine that executes computer software, modules, program codes, and/or instructions on one or more processors which may be part of or external to the platform 100. Merchants may utilize the e-commerce platform 100 for managing commerce with customers, such as by implementing an e-commerce experience with customers through an online store 138, through channels 110A-B, through POS devices 152 in physical locations (e.g., a physical storefront or other location such as through a kiosk, terminal, reader, printer, 3D printer, and the like), by managing their business through the e-commerce platform 100, and by interacting with customers through a communications facility 129 of the e-commerce platform 100, or any combination thereof. A merchant may utilize the e-commerce platform 100 as a sole commerce presence with customers, or in conjunction with other merchant commerce facilities, such as through a physical store (e.g., 'brick-and-mortar' retail stores), a merchant off-platform website 104 (e.g., a commerce Internet website or other internet or web property or asset supported by or on behalf of the merchant separately from the e-commerce platform), and the like. However, even these 'other' merchant commerce facilities may be incorporated into the e-commerce platform, such as where POS devices 152 in a physical store of a merchant are linked into the e-commerce platform 100, where a merchant off-platform website 104 is tied into the e-commerce platform 100, such as through 'buy buttons' that link content from the merchant off platform website 104 to the online store 138, and the like.

The online store 138 may represent a multitenant facility comprising a plurality of virtual storefronts. In embodiments, merchants may manage one or more storefronts in the online store 138, such as through a merchant device 102 (e.g., computer, laptop computer, mobile computing device, and the like), and offer products to customers through a number of different channels 110A-B (e.g., an online store 138; a physical storefront through a POS device 152; electronic marketplace, through an electronic buy button integrated into a website or social media channel such as on a social network, social media page, social media messaging system; and the like). A merchant may sell across channels 110A-B and then manage their sales through the e-commerce platform 100, where channels 110A may be provided internal to the e-commerce platform 100 or from outside the e-commerce channel 110B. A merchant may sell in their physical retail store, at pop ups, through wholesale, over the phone, and the like, and then manage their sales through the e-commerce platform 100. A merchant may employ all or any combination of these, such as maintaining a business through a physical storefront utilizing POS devices 152, maintaining a virtual storefront through the online store 138, and utilizing a communication facility 129 to leverage customer interactions and analytics 132 to improve the probability of sales. Throughout this disclosure the terms online store 138 and storefront may be used synonymously to refer to a merchant's online e-commerce offering presence through the e-commerce platform 100, where an online store 138 may refer to the multitenant collection of storefronts supported by the e-commerce platform 100 (e.g., for a plurality of merchants) or to an individual merchant's storefront (e.g., a merchant's online store).

In some embodiments, a customer may interact through a customer device 150 (e.g., computer, laptop computer, mobile computing device, and the like), a POS device 152 (e.g., retail device, a kiosk, an automated checkout system, and the like), or any other commerce interface device known in the art. The e-commerce platform 100 may enable merchants to reach customers through the online store 138, through POS devices 152 in physical locations (e.g., a merchant's storefront or elsewhere), to promote commerce with customers through dialog via electronic communication facility 129, and the like, providing a system for reaching customers and facilitating merchant services for the real or virtual pathways available for reaching and interacting with customers.

In some embodiments, and as described further herein, the e-commerce platform 100 may be implemented through a processing facility including a processor and a memory, the processing facility storing a set of instructions that, when executed, cause the e-commerce platform 100 to perform the e-commerce and support functions as described herein. The processing facility may be part of a server, client, network infrastructure, mobile computing platform, cloud computing platform, stationary computing platform, or other computing platform, and provide electronic connectivity and communications between and amongst the electronic components of the e-commerce platform 100, merchant devices 102, payment gateways 106, application developers, channels 110A-B, shipping providers 112, customer devices 150, point of sale devices 152, and the like. The e-commerce platform 100 may be implemented as a cloud computing service, a software as a service (SaaS), infrastructure as a service (IaaS), platform as a service (PaaS), desktop as a Service (DaaS), managed software as a service (MSaaS), mobile backend as a service (MBaaS), information technology management as a service (ITMaaS), and the like, such as in a software and delivery model in which software is licensed on a subscription basis and centrally hosted (e.g., accessed by users using a client (for example, a thin client) via a web browser or other application, accessed through by POS devices, and the like). In some embodiments, elements of the e-commerce platform 100 may be implemented to operate on various platforms and operating systems, such as iOS, Android, on the web, and the like (e.g., the administrator 114 being implemented in multiple instances for a given online store for iOS, Android, and for the web, each with similar functionality).

In some embodiments, the online store 138 may be served to a customer device 150 through a webpage provided by a server of the e-commerce platform 100. The server may receive a request for the webpage from a browser or other application installed on the customer device 150, where the browser (or other application) connects to the server through an IP Address, the IP address obtained by translating a domain name. In return, the server sends back the requested webpage. Webpages may be written in or include Hypertext Markup Language (HTML), template language, JavaScript, and the like, or any combination thereof. For instance, HTML is a computer language that describes static information for the webpage, such as the layout, format, and content of the webpage. Website designers and developers may use the template language to build webpages that combine static content, which is the same on multiple pages, and dynamic content, which changes from one page to the next. A template language may make it possible to re-use the static elements that define the layout of a webpage, while dynamically populating the page with data from an online store. The static elements may be written in HTML, and the dynamic elements written in the template language. The template language elements in a file may act as placeholders, such that the code in the file is compiled and sent to the customer device 150 and then the template language is replaced by data from the online store 138, such as when a theme is installed. The template and themes may consider tags, objects, and filters. The client device web browser (or other application) then renders the page accordingly.

In some embodiments, online stores 138 may be served by the e-commerce platform 100 to customers, where customers can browse and purchase the various products available (e.g., add them to a cart, purchase immediately through a buy-button, and the like). Online stores 138 may be served to customers in a transparent fashion without customers necessarily being aware that it is being provided through the e-commerce platform 100 (rather than directly from the merchant). Merchants may use a merchant configurable domain name, a customizable HTML theme, and the like, to customize their online store 138. Merchants may customize the look and feel of their website through a theme system, such as where merchants can select and change the look and feel of their online store 138 by changing their theme while having the same underlying product and business data shown within the online store's product hierarchy. Themes may be further customized through a theme editor, a design interface that enables users to customize their website's design with flexibility. Themes may also be customized using theme-specific settings that change aspects, such as specific colors, fonts, and pre-built layout schemes. The online store may implement a content management system for website content. Merchants may author blog posts or static pages and publish them to their online store 138, such as through blogs, articles, and the like, as well as configure navigation menus. Merchants may upload images (e.g., for products), video, content, data, and the like to the e-commerce platform 100, such as for storage by the system (e.g. as data 134). In some embodiments, the e-commerce platform 100 may provide functions for resizing images, associating an image with a product, adding and associating text with an image, adding an image for a new product variant, protecting images, and the like.

As described herein, the e-commerce platform 100 may provide merchants with transactional facilities for products through a number of different channels 110A-B, including the online store 138, over the telephone, as well as through physical POS devices 152 as described herein. The e-commerce platform 100 may include business support services 116, an administrator 114, and the like associated with running an on-line business, such as providing a domain service 118 associated with their online store, payment services 120 for facilitating transactions with a customer, shipping services 122 for providing customer shipping options for purchased products, risk and insurance services 124 associated with product protection and liability, merchant billing, and the like. Services 116 may be provided via the e-commerce platform 100 or in association with external facilities, such as through a payment gateway 106 for payment processing, shipping providers 112 for expediting the shipment of products, and the like.

In some embodiments, the e-commerce platform 100 may provide for integrated shipping services 122 (e.g., through an e-commerce platform shipping facility or through a third-party shipping carrier), such as providing merchants with real-time updates, tracking, automatic rate calculation, bulk order preparation, label printing, and the like.

Figure 2:
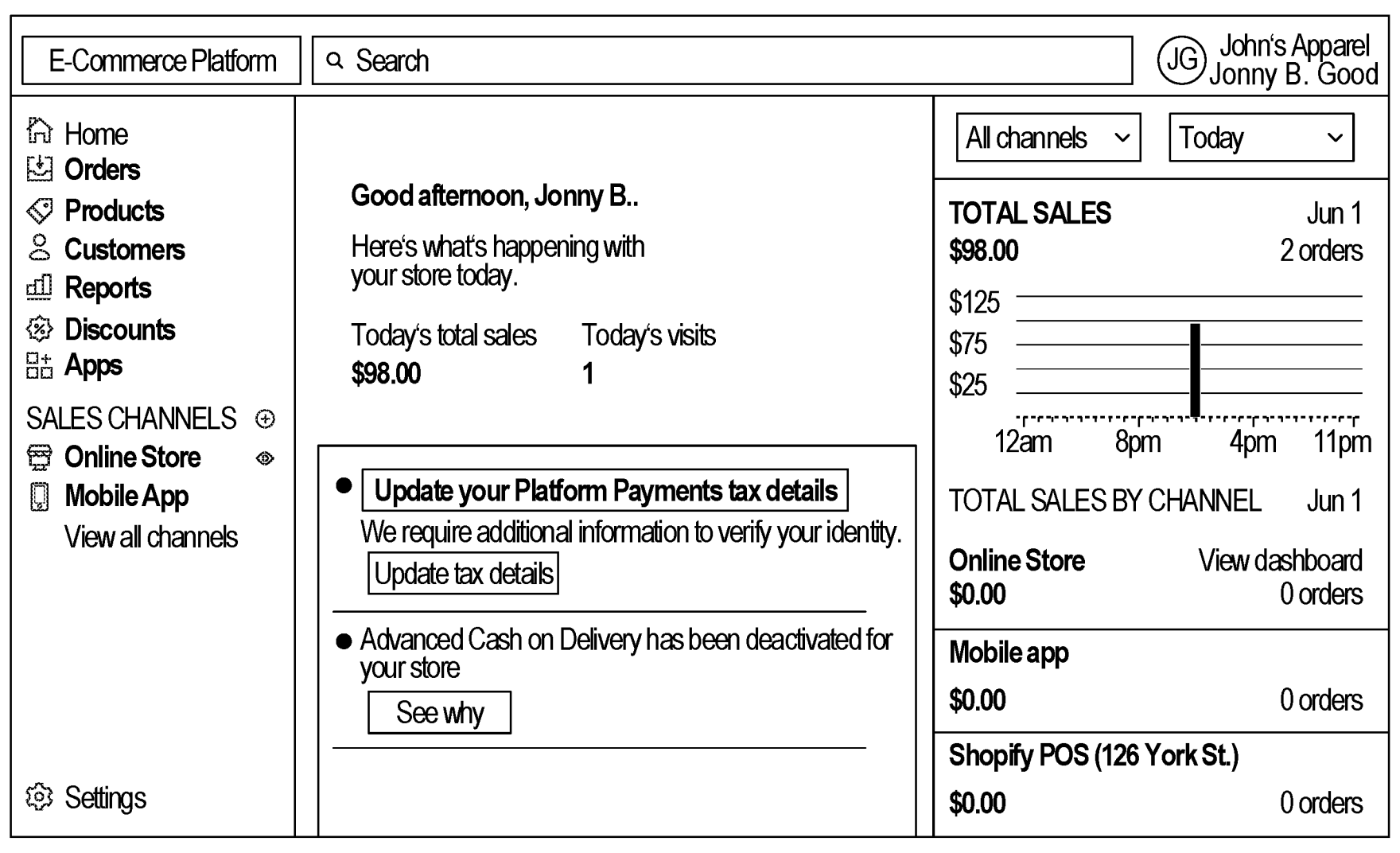

FIG. 2 depicts a non-limiting embodiment for a home page of an administrator 114, which may show information about daily tasks, a store's recent activity, and the next steps a merchant can take to build their business. In some embodiments, a merchant may log in to administrator 114 via a merchant device 102 such as from a desktop computer or mobile device, and manage aspects of their online store 138, such as viewing the online store's 138 recent activity, updating the online store's 138 catalog, managing orders, recent visits activity, total orders activity, and the like. In some embodiments, the merchant may be able to access the different sections of administrator 114 by using the sidebar, such as shown on FIG. 2. Sections of the administrator 114 may include various interfaces for accessing and managing core aspects of a merchant's business, including orders, products, customers, available reports and discounts. The administrator 114 may also include interfaces for managing sales channels for a store including the online store, mobile application(s) made available to customers for accessing the store (Mobile App), POS devices, and/or a buy button. The administrator 114 may also include interfaces for managing applications (Apps) installed on the merchant's account; settings applied to a merchant's online store 138 and account. A merchant may use a search bar to find products, pages, or other information. Depending on the device 102 or software application the merchant is using, they may be enabled for different functionality through the administrator 114. For instance, if a merchant logs in to the administrator 114 from a browser, they may be able to manage all aspects of their online store 138. If the merchant logs in from their mobile device (e.g. via a mobile application), they may be able to view all or a subset of the aspects of their online store 138, such as viewing the online store's 138 recent activity, updating the online store's 138 catalog, managing orders, and the like.

More detailed information about commerce and visitors to a merchant's online store 138 may be viewed through acquisition reports or metrics, such as displaying a sales summary for the merchant's overall business, specific sales and engagement data for active sales channels, and the like. Reports may include, acquisition reports, behavior reports, customer reports, finance reports, marketing reports, sales reports, custom reports, and the like. The merchant may be able to view sales data for different channels 110A-B from different periods of time (e.g., days, weeks, months, and the like), such as by using drop-down menus. An overview dashboard may be provided for a merchant that wants a more detailed view of the store's sales and engagement data. An activity feed in the home metrics section may be provided to illustrate an overview of the activity on the merchant's account. For example, by clicking on a 'view all recent activity' dashboard button, the merchant may be able to see a longer feed of recent activity on their account. A home page may show notifications about the merchant's online store 138, such as based on account status, growth, recent customer activity, and the like. Notifications may be provided to assist a merchant with navigating through a process, such as capturing a payment, marking an order as fulfilled, archiving an order that is complete, and the like.

The e-commerce platform 100 may provide for a communications facility 129 and associated merchant interface for providing electronic communications and marketing, such as utilizing an electronic messaging aggregation facility for collecting and analyzing communication interactions between merchants, customers, merchant devices 102, customer devices 150, POS devices 152, and the like, to aggregate and analyze the communications, such as for increasing the potential for providing a sale of a product, and the like. For instance, a customer may have a question related to a product, which may produce a dialog between the customer and the merchant (or automated processor-based agent representing the merchant), where the communications facility 129 analyzes the interaction and provides analysis to the merchant on how to improve the probability for a sale.

The e-commerce platform 100 may provide a financial facility 120 for secure financial transactions with customers, such as through a secure card server environment. The e-commerce platform 100 may store credit card information, such as in payment card industry data (PCI) environments (e.g., a card server), to reconcile financials, bill merchants, perform automated clearing house (ACH) transfers between an e-commerce platform 100 financial institution account and a merchant's back account (e.g., when using capital), and the like. These systems may have Sarbanes-Oxley Act (SOX) compliance and a high level of diligence required in their development and operation. The financial facility 120 may also provide merchants with financial support, such as through the lending of capital (e.g., lending funds, cash advances, and the like) and provision of insurance. In addition, the e-commerce platform 100 may provide for a set of marketing and partner services and control the relationship between the e-commerce platform 100 and partners. They also may connect and onboard new merchants with the e-commerce platform 100. These services may enable merchant growth by making it easier for merchants to work across the e-commerce platform 100. Through these services, merchants may be provided help facilities via the e-commerce platform 100.

In some embodiments, online store 138 may support a great number of independently administered storefronts and process a large volume of transactional data on a daily basis for a variety of products. Transactional data may include customer contact information, billing information, shipping information, information on products purchased, information on services rendered, and any other information associated with business through the e-commerce platform 100. In some embodiments, the e-commerce platform 100 may store this data in a data facility 134. The transactional data may be processed to produce analytics 132, which in turn may be provided to merchants or third-party commerce entities, such as providing consumer trends, marketing and sales insights, recommendations for improving sales, evaluation of customer behaviors, marketing and sales modeling, trends in fraud, and the like, related to online commerce, and provided through dashboard interfaces, through reports, and the like. The e-commerce platform 100 may store information about business and merchant transactions, and the data facility 134 may have many ways of enhancing, contributing, refining, and extracting data, where over time the collected data may enable improvements to aspects of the e-commerce platform 100.

Referring again to FIG. 1, in some embodiments the e-commerce platform 100 may be configured with a commerce management engine 136 for content management, task automation and data management to enable support and services to the plurality of online stores 138 (e.g., related to products, inventory, customers, orders, collaboration, suppliers, reports, financials, risk and fraud, and the like), but be extensible through applications 142A-B that enable greater flexibility and custom processes required for accommodating an ever-growing variety of merchant online stores, POS devices, products, and services, where applications 142A may be provided internal to the e-commerce platform 100 or applications 142B from outside the e-commerce platform 100. In some embodiments, an application 142A may be provided by the same party providing the platform 100 or by a different party. In some embodiments, an application 142B may be provided by the same party providing the platform 100 or by a different party. The commerce management engine 136 may be configured for flexibility and scalability through portioning (e.g., sharding) of functions and data, such as by customer identifier, order identifier, online store identifier, and the like. The commerce management engine 136 may accommodate store-specific business logic and in some embodiments, may incorporate the administrator 114 and/or the online store 138.

The commerce management engine 136 includes base or "core" functions of the e-commerce platform 100, and as such, as described herein, not all functions supporting online stores 138 may be appropriate for inclusion. For instance, functions for inclusion into the commerce management engine 136 may need to exceed a core functionality threshold through which it may be determined that the function is core to a commerce experience (e.g., common to a majority of online store activity, such as across channels, administrator interfaces, merchant locations, industries, product types, and the like), is re-usable across online stores 138 (e.g., functions that can be re-used/modified across core functions), limited to the context of a single online store 138 at a time (e.g., implementing an online store 'isolation principle', where code should not be able to interact with multiple online stores 138 at a time, ensuring that online stores 138 cannot access each other's data), provide a transactional workload, and the like. Maintaining control of what functions are implemented may enable the commerce management engine 136 to remain responsive, as many required features are either served directly by the commerce management engine 136 or enabled through an interface 140A-B, such as by its extension through an application programming interface (API) connection to applications 142A-B and channels 110A-B, where interfaces 140A may be provided to applications 142A and/or channels 110A inside the e-commerce platform 100 or through interfaces 140B provided to applications 142B and/or channels 110B outside the e-commerce platform 100. Generally, the platform 100 may include interfaces 140A-B (which may be extensions, connectors, APIs, and the like) which may facilitate connections to and communications with other platforms, systems, software, data sources, code and the like. Such interfaces 140A-B may be an interface 140A of the commerce management engine 136 or an interface 140B of the platform 100 more generally. If care is not given to restricting functionality in the commerce management engine 136, responsiveness could be compromised, such as through infrastructure degradation through slow databases or non-critical backend failures, through catastrophic infrastructure failure such as with a data center going offline, through new code being deployed that takes longer to execute than expected, and the like. To prevent or mitigate these situations, the commerce management engine 136 may be configured to maintain responsiveness, such as through configuration that utilizes timeouts, queues, back-pressure to prevent degradation, and the like.

Although isolating online store data is important to maintaining data privacy between online stores 138 and merchants, there may be reasons for collecting and using cross-store data, such as for example, with an order risk assessment system or a platform payment facility, both of which require information from multiple online stores 138 to perform well. In some embodiments, rather than violating the isolation principle, it may be preferred to move these components out of the commerce management engine 136 and into their own infrastructure within the e-commerce platform 100.

In some embodiments, the e-commerce platform 100 may provide for a platform payment facility 120, which is another example of a component that utilizes data from the commerce management engine 136 but may be located outside so as to not violate the isolation principle. The platform payment facility 120 may allow customers interacting with online stores 138 to have their payment information stored safely by the commerce management engine 136 such that they only have to enter it once. When a customer visits a different online store 138, even if they've never been there before, the platform payment facility 120 may recall their information to enable a more rapid and correct check out. This may provide a cross-platform network effect, where the e-commerce platform 100 becomes more useful to its merchants as more merchants join, such as because there are more customers who checkout more often because of the ease of use with respect to customer purchases. To maximize the effect of this network, payment information for a given customer may be retrievable from an online store's checkout, allowing information to be made available globally across online stores 138. It would be difficult and error prone for each online store 138 to be able to connect to any other online store 138 to retrieve the payment information stored there. As a result, the platform payment facility may be implemented external to the commerce management engine 136.

For those functions that are not included within the commerce management engine 136, applications 142A-B provide a way to add features to the e-commerce platform 100. Applications 142A-B may be able to access and modify data on a merchant's online store 138, perform tasks through the administrator 114, create new flows for a merchant through a user interface (e.g., that is surfaced through extensions/API), and the like. Merchants may be enabled to discover and install applications 142A-B through application search, recommendations, and support 128. In some embodiments, core products, core extension points, applications, and the administrator 114 may be developed to work together. For instance, application extension points may be built inside the administrator 114 so that core features may be extended by way of applications, which may deliver functionality to a merchant through the extension.

In some embodiments, applications 142A-B may deliver functionality to a merchant through the interface 140A-B, such as where an application 142A-B is able to surface transaction data to a merchant (e.g., App: "Engine, surface my app data in mobile and web admin using the embedded app SDK"), and/or where the commerce management engine 136 is able to ask the application to perform work on demand (Engine: "App, give me a local tax calculation for this checkout").

Applications 142A-B may support online stores 138 and channels 110A-B, provide for merchant support, integrate with other services, and the like. Where the commerce management engine 136 may provide the foundation of services to the online store 138, the applications 142A-B may provide a way for merchants to satisfy specific and sometimes unique needs. Different merchants will have different needs, and so may benefit from different applications 142A-B. Applications 142A-B may be better discovered through the e-commerce platform 100 through development of an application taxonomy (categories) that enable applications to be tagged according to a type of function it performs for a merchant; through application data services that support searching, ranking, and recommendation models; through application discovery interfaces such as an application store, home information cards, an application settings page; and the like.

Applications 142A-B may be connected to the commerce management engine 136 through an interface 140A-B, such as utilizing APIs to expose the functionality and data available through and within the commerce management engine 136 to the functionality of applications (e.g., through REST, GraphQL, and the like). For instance, the e-commerce platform 100 may provide API interfaces 140A-B to merchant and partner-facing products and services, such as including application extensions, process flow services, developer-facing resources, and the like. With customers more frequently using mobile devices for shopping, applications 142A-B related to mobile use may benefit from more extensive use of APIs to support the related growing commerce traffic. The flexibility offered through use of applications and APIs (e.g., as offered for application development)

enable the e-commerce platform 100 to better accommodate new and unique needs of merchants (and internal developers through internal APIs) without requiring constant change to the commerce management engine 136, thus providing merchants what they need when they need it. For instance, shipping services 122 may be integrated with the commerce management engine 136 through a shipping or carrier service API, thus enabling the e-commerce platform 100 to provide shipping service functionality without directly impacting code running in the commerce management engine 136.

Many merchant problems may be solved by letting partners improve and extend merchant workflows through application development, such as problems associated with back-office operations (merchant-facing applications 142A-B) and in the online store 138 (customer-facing applications 142A-B). As a part of doing business, many merchants will use mobile and web related applications on a daily basis for back-office tasks (e.g., merchandising, inventory, discounts, fulfillment, and the like) and online store tasks (e.g., applications related to their online shop, for flash-sales, new product offerings, and the like), where applications 142A-B, through extension/API 140A-B, help make products easy to view and purchase in a fast growing marketplace. In some embodiments, partners, application developers, internal applications facilities, and the like, may be provided with a software development kit (SDK), such as through creating a frame within the administrator 114 that sandboxes an application interface. In some embodiments, the administrator 114 may not have control over nor be aware of what happens within the frame. The SDK may be used in conjunction with a user interface kit to produce interfaces that mimic the look and feel of the e-commerce platform 100, such as acting as an extension of the commerce management engine 136.

Applications 142A-B that utilize APIs may pull data on demand, but often they also need to have data pushed when updates occur. Update events may be implemented in a subscription model, such as for example, customer creation, product changes, or order cancelation. Update events may provide merchants with needed updates with respect to a changed state of the commerce management engine 136, such as for synchronizing a local database, notifying an external integration partner, and the like. Update events may enable this functionality without having to poll the commerce management engine 136 all the time to check for updates, such as through an update event subscription. In some embodiments, when a change related to an update event subscription occurs, the commerce management engine 136 may post a request, such as to a predefined callback URL. The body of this request may contain a new state of the object and a description of the action or event. Update event subscriptions may be created manually, in the administrator facility 114, or automatically (e.g., via the API 140A-B). In some embodiments, update events may be queued and processed asynchronously from a state change that triggered them, which may produce an update event notification that is not distributed in real-time.

In some embodiments, the e-commerce platform 100 may provide application search, recommendation and support 128. Application search, recommendation and support 128 may include developer products and tools to aid in the development of applications, an application dashboard (e.g., to provide developers with a development interface, to administrators for management of applications, to merchants for customization of applications, and the like), facilities for installing and providing permissions with respect to providing access to an application 142A-B (e.g., for public access, such as where criteria must be met before being installed, or for private use by a merchant), application searching to make it easy for a merchant to search for applications 142A-B that satisfy a need for their online store 138, application recommendations to provide merchants with suggestions on how they can improve the user experience through their online store 138, a description of core application capabilities within the commerce management engine 136, and the like. These support facilities may be utilized by application development performed by any entity, including the merchant developing their own application 142A-B, a third-party developer developing an application 142A-B (e.g., contracted by a merchant, developed on their own to offer to the public, contracted for use in association with the e-commerce platform 100, and the like), or an application 142A or 142B being developed by internal personal resources associated with the e-commerce platform 100. In some embodiments, applications 142A-B may be assigned an application identifier (ID), such as for linking to an application (e.g., through an API), searching for an application, making application recommendations, and the like.

The commerce management engine 136 may include base functions of the e-commerce platform 100 and expose these functions through APIs 140A-B to applications 142A-B. The APIs 140A-B may enable different types of applications built through application development. Applications 142A-B may be capable of satisfying a great variety of needs for merchants but may be grouped roughly into three categories: customer-facing applications, merchant-facing applications, integration applications, and the like. Customer-facing applications 142A-B may include online store 138 or channels 110A-B that are places where merchants can list products and have them purchased (e.g., the online store, applications for flash sales (e.g., merchant products or from opportunistic sales opportunities from third-party sources), a mobile store application, a social media channel, an application for providing wholesale purchasing, and the like). Merchant-facing applications 142A-B may include applications that allow the merchant to administer their online store 138 (e.g., through applications related to the web or website or to mobile devices), run their business (e.g., through applications related to POS devices), to grow their business (e.g., through applications related to shipping (e.g., drop shipping), use of automated agents, use of process flow development and improvements), and the like. Integration applications may include applications that provide useful integrations that participate in the running of a business, such as shipping providers 112 and payment gateways.

In some embodiments, an application developer may use an application proxy to fetch data from an outside location and display it on the page of an online store 138. Content on these proxy pages may be dynamic, capable of being updated, and the like. Application proxies may be useful for displaying image galleries, statistics, custom forms, and other kinds of dynamic content. The core-application structure of the e-commerce platform 100 may allow for an increasing number of merchant experiences to be built in applications 142A-B so that the commerce management engine 136 can remain focused on the more commonly utilized business logic of commerce.

The e-commerce platform 100 provides an online shopping experience through a curated system architecture that enables merchants to connect with customers in a flexible and transparent manner. A typical customer experience may be better understood through an embodiment example purchase workflow, where the customer browses the merchant's products on a channel 110A-B, adds what they intend to buy to their cart, proceeds to checkout, and pays for the content of their cart resulting in the creation of an order for the merchant. The merchant may then review and fulfill (or cancel) the order. The product is then delivered to the customer. If the customer is not satisfied, they might return the products to the merchant.

In an example embodiment, a customer may browse a merchant's products on a channel 110A-B. A channel 110A-B is a place where customers can view and buy products. In some embodiments, channels 110A-B may be modeled as applications 142A-B (a possible exception being the online store 138, which is integrated within the commence management engine 136). A merchandising component may allow merchants to describe what they want to sell and where they sell it. The association between a product and a channel may be modeled as a product publication and accessed by channel applications, such as via a product listing API. A product may have many options, like size and color, and many variants that expand the available options into specific combinations of all the options, like the variant that is extra-small and green, or the variant that is size large and blue. Products may have at least one variant (e.g., a "default variant" is created for a product without any options). To facilitate browsing and management, products may be grouped into collections, provided product identifiers (e.g., stock keeping unit (SKU)) and the like. Collections of products may be built by either manually categorizing products into one (e.g., a custom collection), by building rulesets for automatic classification (e.g., a smart collection), and the like. Products may be viewed as 2D images, 3D images, rotating view images, through a virtual or augmented reality interface, and the like.

In some embodiments, the customer may add what they intend to buy to their cart (in an alternate embodiment, a product may be purchased directly, such as through a buy button as described herein). Customers may add product variants to their shopping cart. The shopping cart model may be channel specific. The online store 138 cart may be composed of multiple cart line items, where each cart line item tracks the quantity for a product variant. Merchants may use cart scripts to offer special promotions to customers based on the content of their cart. Since adding a product to a cart does not imply any commitment from the customer or the merchant, and the expected lifespan of a cart may be in the order of minutes (not days), carts may be persisted to an ephemeral data store.

The customer then proceeds to checkout. A checkout component may implement a web checkout as a customer-facing order creation process. A checkout API may be provided as a computer-facing order creation process used by some channel applications to create orders on behalf of customers (e.g., for point of sale). Checkouts may be created from a cart and record a customer's information such as email address, billing, and shipping details. On checkout, the merchant commits to pricing. If the customer inputs their contact information but does not proceed to payment, the e-commerce platform 100 may provide an opportunity to re-engage the customer (e.g., in an abandoned checkout feature). For those reasons, checkouts can have much longer lifespans than carts (hours or even days) and are therefore persisted. Checkouts may calculate taxes and shipping costs based on the customer's shipping address. Checkout may delegate the calculation of taxes to a tax component and the calculation of shipping costs to a delivery component. A pricing component may enable merchants to create discount codes (e.g., 'secret' strings that when entered on the checkout apply new prices to the items in the checkout). Discounts may be used by merchants to attract customers and assess the performance of marketing campaigns. Discounts and other custom price systems may be implemented on top of the same platform piece, such as through price rules (e.g., a set of prerequisites that when met imply a set of entitlements). For instance, prerequisites may be items such as "the order subtotal is greater than $100" or "the shipping cost is under $10", and entitlements may be items such as "a 20% discount on the whole order" or "$10 off products X, Y, and Z".

Customers then pay for the content of their cart resulting in the creation of an order for the merchant. Channels 110A-B may use the commerce management engine 136 to move money, currency or a store of value (such as dollars or a cryptocurrency) to and from customers and merchants. Communication with the various payment providers (e.g., online payment systems, mobile payment systems, digital wallet, credit card gateways, and the like) may be implemented within a payment processing component. The actual interactions with the payment gateways 106 may be provided through a card server environment. In some embodiments, the payment gateway 106 may accept international payment, such as integrating with leading international credit card processors. The card server environment may include a card server application, card sink, hosted fields, and the like. This environment may act as the secure gatekeeper of the sensitive credit card information. In some embodiments, most of the process may be orchestrated by a payment processing job. The commerce management engine 136 may support many other payment methods, such as through an offsite payment gateway 106 (e.g., where the customer is redirected to another website), manually (e.g., cash), online payment methods (e.g., online payment systems, mobile payment systems, digital wallet, credit card gateways, and the like), gift cards, and the like. At the end of the checkout process, an order is created. An order is a contract of sale between the merchant and the customer where the merchant agrees to provide the goods and services listed on the orders (e.g., order line items, shipping line items, and the like) and the customer agrees to provide payment (including taxes). This process may be modeled in a sales component. Channels 110A-B that do not rely on commerce management engine 136 checkouts may use an order API to create orders. Once an order is created, an order confirmation notification may be sent to the customer and an order placed notification sent to the merchant via a notification component. Inventory may be reserved when a payment processing job starts to avoid over-selling (e.g., merchants may control this behavior from the inventory policy of each variant). Inventory reservation may have a short time span (minutes) and may need to be very fast and scalable to support flash sales (e.g., a discount or promotion offered for a short time, such as targeting impulse buying). The reservation is released if the payment fails. When the payment succeeds, and an order is created, the reservation is converted into a long-term inventory commitment allocated to a specific location. An inventory component may record where variants are stocked, and tracks quantities for variants that have inventory tracking enabled. It may decouple product variants (a customer facing concept representing the template of a product listing) from inventory items (a merchant facing concept that represent an item whose quantity and location is managed). An inventory level component may keep track of quantities that are available for sale, committed to an order or incoming from an inventory transfer component (e.g., from a vendor).

The merchant may then review and fulfill (or cancel) the order. A review component may implement a business process merchant's use to ensure orders are suitable for fulfillment before actually fulfilling them. Orders may be fraudulent, require verification (e.g., ID checking), have a payment method which requires the merchant to wait to make sure they will receive their funds, and the like. Risks and recommendations may be persisted in an order risk model. Order risks may be generated from a fraud detection tool, submitted by a third-party through an order risk API, and the like. Before proceeding to fulfillment, the merchant may need to capture the payment information (e.g., credit card information) or wait to receive it (e.g., via a bank transfer, check, and the like) and mark the order as paid. The merchant may now prepare the products for delivery. In some embodiments, this business process may be implemented by a fulfillment component. The fulfillment component may group the line items of the order into a logical fulfillment unit of work based on an inventory location and fulfillment service. The merchant may review, adjust the unit of work, and trigger the relevant fulfillment services, such as through a manual fulfillment service (e.g., at merchant managed locations) used when the merchant picks and packs the products in a box, purchase a shipping label and input its tracking number, or just mark the item as fulfilled. A custom fulfillment service may send an email (e.g., a location that doesn't provide an API connection). An API fulfillment service may trigger a third party, where the third-party application creates a fulfillment record. A legacy fulfillment service may trigger a custom API call from the commerce management engine 136 to a third party (e.g., fulfillment by Amazon). A gift card fulfillment service may provision (e.g., generating a number) and activate a gift card. Merchants may use an order printer application to print packing slips. The fulfillment process may be executed when the items are packed in the box and ready for shipping, shipped, tracked, delivered, verified as received by the customer, and the like.

If the customer is not satisfied, they may be able to return the product(s) to the merchant. The business process merchants may go through to "un-sell" an item may be implemented by a return component. Returns may consist of a variety of different actions, such as a restock, where the product that was sold actually comes back into the business and is sellable again; a refund, where the money that was collected from the customer is partially or fully returned; an accounting adjustment noting how much money was refunded (e.g., including if there was any restocking fees, or goods that weren't returned and remain in the customer's hands); and the like. A return may represent a change to the contract of sale (e.g., the order), and where the e-commerce platform 100 may make the merchant aware of compliance issues with respect to legal obligations (e.g., with respect to taxes). In some embodiments, the e-commerce platform 100 may enable merchants to keep track of changes to the contract of sales over time, such as implemented through a sales model component (e.g., an append-only date-based ledger that records sale-related events that happened to an item).

Generating Digital Layouts Using an E-Commerce Platform

Figure 3:
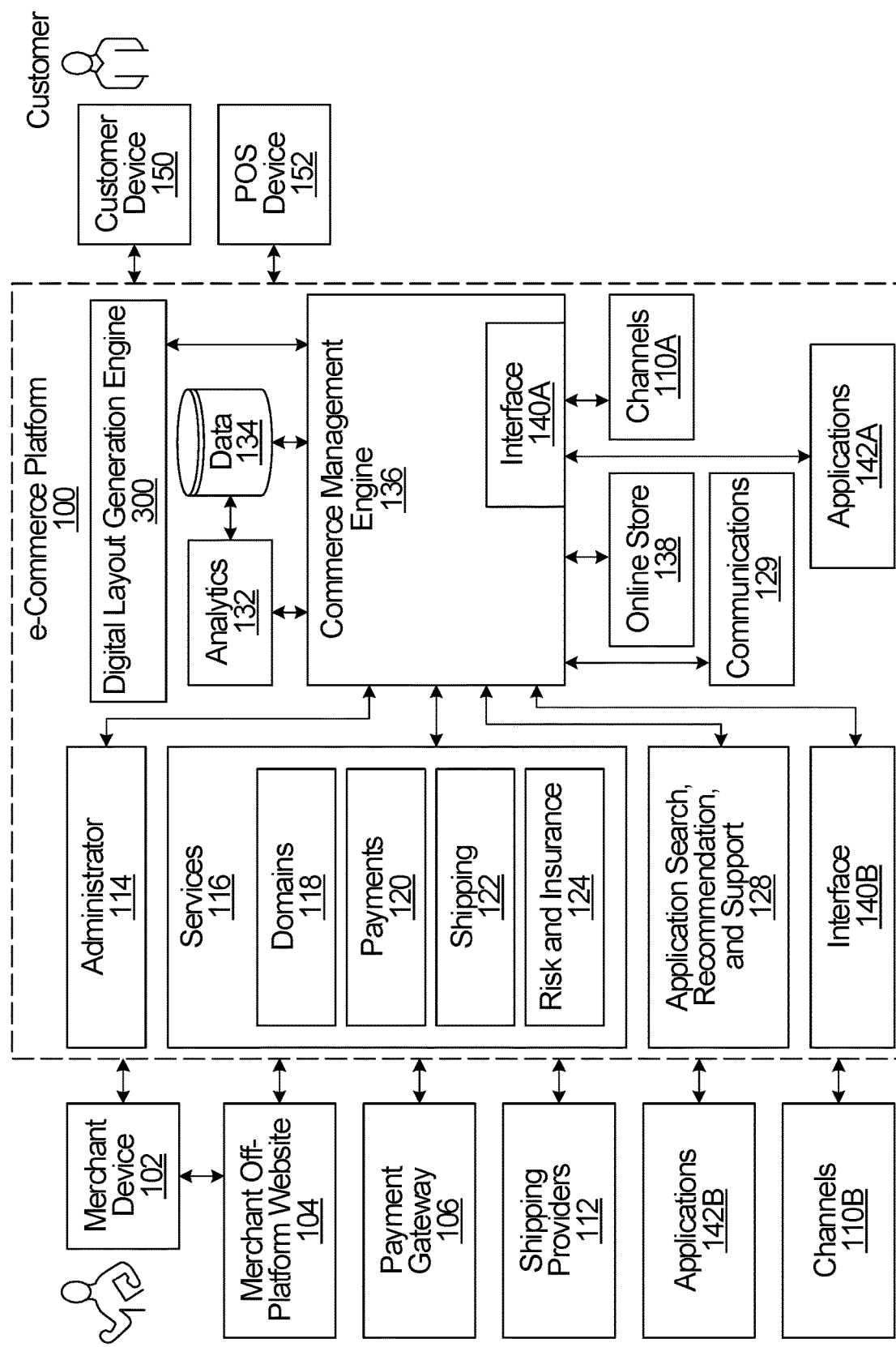
FIG. 3 illustrates the e-commerce platform of FIG. 1, but including a digital layout generation engine.

The e-commerce platform 100 can be configured to generate digital layouts for use by merchants or other users. FIG. 3 illustrates the e-commerce platform 100 of FIG. 1, but including a digital layout generation engine 300. The digital layout generation engine 300 is an example of a computer-implemented system for generating digital layouts or templates. Non-limiting examples of such digital layouts include layouts for emails and webpages. In one example, a merchant provides the digital layout generation engine 300 with the features (for example, the content and appearance) of an email to be displayed on the customer device 150, and the digital layout generation engine 300 formats and generates the email. In another example, a merchant provides the digital layout generation engine 300 with the features of a webpage for the online store 138, and the digital layout generation engine 300 formats and generates the webpage.

Although the digital layout generation engine 300 is illustrated as a distinct component of the e-commerce platform 100 in FIG. 3, this is only an example. A digital layout generation engine could also or instead be provided by another component of the e-commerce platform 100 or offered as a stand-alone component or service that is external to the platform 100. In some embodiments, either or both of the applications 142A-B provide a digital layout generation engine in the form of a downloadable app that is available to merchants. Furthermore, in some embodiments, the commerce management engine 136 provides a digital layout generation engine. The e-commerce platform 100 could include multiple digital layout generation engines that are provided by one or more parties. The multiple digital layout generation engines could be implemented in the same way, in similar ways and/or in distinct ways. In addition, at least a portion of a digital layout generation engine could be implemented on the merchant device 102. For example, the merchant device 102 could store and run the digital layout generation engine locally as a software application.

As discussed in further detail below, the digital layout generation engine 300 could implement at least some of the functionality described herein. Although the embodiments described below may be implemented in association with an e-commerce platform, such as (but not limited to) the e-commerce platform 100, the embodiments described below are not limited to the specific e-commerce platform 100 of FIGS. 1 to 3. Therefore, the embodiments below will be presented more generally in relation to any e-commerce platform. However, more generally, embodiments described herein do not necessarily need to be implemented in association with or involve an e-commerce platform Computer-Generated Digital Layouts An e-commerce platform can provide merchants with access to digital layout templates for any of a variety of different applications. By way of example, an e-commerce platform can provide access to messaging templates such as for email or SMS messages, for marketing and other purposes. An email template may include pre-defined formatting that outlines how features are organized in an email and can be used to quickly generate emails to send to customers. A merchant can select the features that they wish to include in an email, and then the template defines, at least in part, how these features will be presented to customers. Similar comments apply to webpage templates.

Some templates utilize sections to organize features in a digital layout. A merchant can choose both the content included in the section and the visual appearance of the section, which are examples of features for the section. Content relates to the information and/or functionality that is provided by a section, whereas a visual appearance relates to how a section looks. Non-limiting examples of different types of content include text, images, videos and action elements (for example, text boxes, buttons and website links). In some embodiments, each section of a digital layout includes a single type of content. The visual appearance of a section can include the background color of the section and the font used in the section, for example. The content and appearance of a section can be interrelated. For example, the appearance of a section can define, at least in part, the way that content is presented in the section.

A merchant can also select the location and/or the order of the sections in a digital layout. The sections can be arranged one after another in the digital layout, but this might not always be the case. A digital layout that has multiple columns of sections is also possible. Once the features in multiple sections are defined, a template can be used to format the multiple sections into a digital layout having a particular design. For example, a template may define the size (i.e., length and/or height) of each section and the spacing between different sections. The spacing between sections can be defined, at least in part, by section padding. Padding is the distance between an edge of a section and the first instance of content within the section. For example, padding could be the distance between the start of a section and the first pixel of text in that section.

In some cases, templates and pre-defined formatting can result in superfluous gaps or separations between related sections in a digital layout. This can lead to digital layout designs that are difficult for a customer to parse and understand and can result in customer error in taking appropriate actions. This can also lead to digital layout designs that do not appropriately apply design rules and are therefore not visually appealing. In one example, a pre-defined format can separate action elements from the accompanying text that provides context for the action elements. From a customer perspective, this may lead to confusion as to whether or not the actions elements relate to the text.

Figure 4:
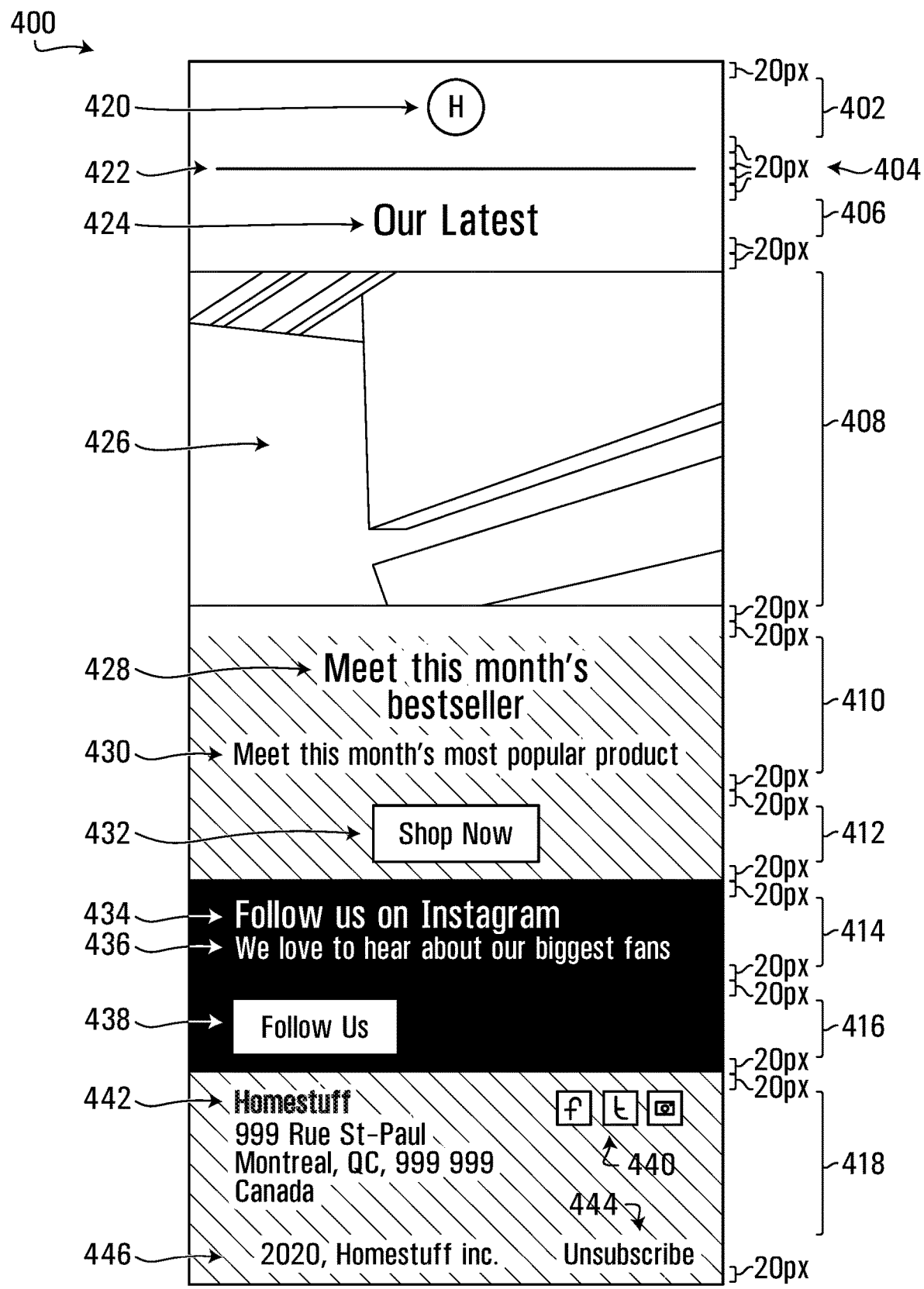
FIG. 4 illustrates an example email that is generated using an email template with pre-defined formatting.

FIG. 4 illustrates an example email 400 that is generated using an email template with pre-defined or pre-determined formatting. The email 400 is an example of a marketing message that is associated with a merchant's online store on an e-commerce platform. The email 400 can be sent to and displayed on a customer device. The email 400 includes multiple sections 402, 404, 406, 408, 410, 412, 414, 416, 418.

The section 402 includes content 420 and a white background. The content 420 includes an image of a logo, which is centered in the section 402. The white background color defines, at least in part, an appearance of the section 402. The section 402 is positioned at the top of the email 400 and could be considered a header section.

The section 404 includes content 422 and a white background. The content 422 includes a centered horizontal line, which defines a break in the email 400. A break is any feature that implies a division between sections. As such, the section 404 could be considered a break section to separate the header section 402 from the remainder of the email 400.

The section 406 includes content 424 and a white background. The content 424 includes text having an associated font, font size, color, line height and centered alignment. The font, font size, color, line height and alignment defines, in part, an appearance of the section 406. Because the section 406 is the first section that includes text in the email 400, and the font size of the text is relatively large compared to the rest of the email 400, the section 406 could be considered a title section.

The section 408 includes content 426 and a white background. The content 426 includes an image that spans the width of the section 408. The section 408 is primarily defined by this image, and could be considered an image-based section.

The section 410 includes content 428, 430 and a hatched background. The content 428, 430 includes separate instances of text. In the illustrated example, the font size of the content 430 is significantly smaller than the font size of the content 428, and the color of the content 430 differs from that of the content 428. The section 410 could be considered a text-based section.

The section 412 includes content 432 and a hatched background. The content 432 includes an action element that acts as a button or link. The content 432 is selectable by a customer via a user interface, which would then direct the customer to a webpage for an online store. The content 432 is displayed as a centered rectangle including text and a white color, which at least in part defines an appearance of the section 412. The section 412 could be considered an action-based section.

The section 414 includes content 434, 436 and a black background. The content 434, 436 includes multiple instances of text having different font sizes and colors. The section 414 is another example of a text-based section.

The section 416 includes content 438 and a black background. The content 432 includes an action element in the form of a centered rectangle having text and a white color. The content 438 acts as a button or link that can direct a customer to a webpage of a social media platform. The section 416 is another example of an action-based section.

The section 418 includes content 440, 442, 444, 446 and a hatched background. The content 440 includes multiple right-aligned action elements. In the illustrated example, each action element in the content 440 includes a logo of a particular social media platform and a link to that social media platform. A user many select any of the action elements in the content 440 to be directed to the associated social media platform. The content 442 includes multiple lines of text, where the first line of text is bolded. This bolded text defines, in part, an appearance of the section 418. The content 442 provides a business address for the merchant associated with the email 400. The content 444 includes a right-aligned action element that includes text and a link allowing a customer to unsubscribe from emails from the merchant. The content 446 includes text that identifies the copyright of the email 400. In the illustrated example, there is a vertically extending gap between the content 440, 442 and the content 444, 446. Because the section 418 is located at the end of the email 400 and includes contact information, the section 418 could be considered a concluding section.

It should be noted that the colors in the email 400 are provided by way of example only. The colors in a digital layout are in no way limited to shades of black and white. In some embodiments, any of a number of different background colors and text colors could be used.

In FIG. 4, the sections 402, 404, 406, 408, 410, 412, 414, 416, 418 are formatted by a computer-implemented system according to a pre-defined email template. The email template determines an appropriate size (i.e., height) of each of the sections 402, 404, 406, 408, 410, 412, 414, 416, 418 to fit the associated content. The template also defines a padding of 20 pixels (px) at the top and bottom of each of the sections 402, 404, 406, 408, 410, 412, 414, 416, 418. This padding is blank space that has the same background color as the associated section. The padding in the template forms a spacing of 20 px at the top and bottom of the email 400, and a total spacing of 40 px between each of the sections 402, 404, 406, 408, 410, 412, 414, 416, 418.

The pre-defined format that is used to generate the email 400 is an example of a format with a uniform implementation of padding. Each pair of adjacent sections in the email 400 are spaced apart by the same number of pixels. This may lead to customer confusion in some cases. For example, some of the sections 402, 404, 406, 408, 410, 412, 414, 416,

418 are associated with each other, but the email 400 fails to convey that association in the spacing between the sections 402, 404, 406, 408, 410, 412, 414, 416, 418. Instead, the same spacing between sections is used for associated sections and non-associated sections, which may cause customer confusion as to which sections are associated.

An example of two associated sections is the sections 410, 412. The text in the content 428, 430 relates to popular products, and the action element in the content 432 provides a link to a webpage for purchasing those products. As such, the content 428, 430 relates to the content 432, and the section 410 is associated with the section 412. Another example of two associated sections is the sections 414, 416. The text in the content 434, 436 relates to a social media account, and the action element in the content 438 provides a link to a webpage for this social media account. As such, the content 434, 436 relates to the content 438, and the section 414 is associated with the section 416.

An example of two sections are that are not associated is the sections 412, 414. As noted above, the section 412 relates to popular products, whereas the section 414 relates to social media. However, as a result of the uniform implementation of padding in the email 400, the section 412 is equidistant from the section 410 and from the section 414. The format of the email 400 does not distinguish between sections that are associated and sections that are not associated. As such, a customer might confuse the action element in the content 432 as relating to the text in the content 434. This could cause the customer to select the action element in the content 432 when the customer actually intended to be directed to the merchant's social media account through the action element in the content 438.

The uniform implementation of padding for both associated sections and non-associated sections in the email 400 reflects a limitation of the computer-implemented method and system used to generate the email 400. For example, this computer-implemented system lacks the ability to analyse the features in different sections of an email, detect associations between sections, and format the email based on the detected associations.

Generating Digital Layouts with Feature-Based Formatting

An aspect of the present disclosure relates to computer-implemented methods and associated systems for automatically and dynamically determining the format of a digital layout based on features in the digital layout. According to an embodiment, related features in different sections of a digital layout are detected and then the format of the digital layout is determined accordingly. This is also referred to as feature-based formatting for a digital layout. Feature-based formatting can improve the clarity, appeal and effectiveness of the digital layout.

Figure 5:
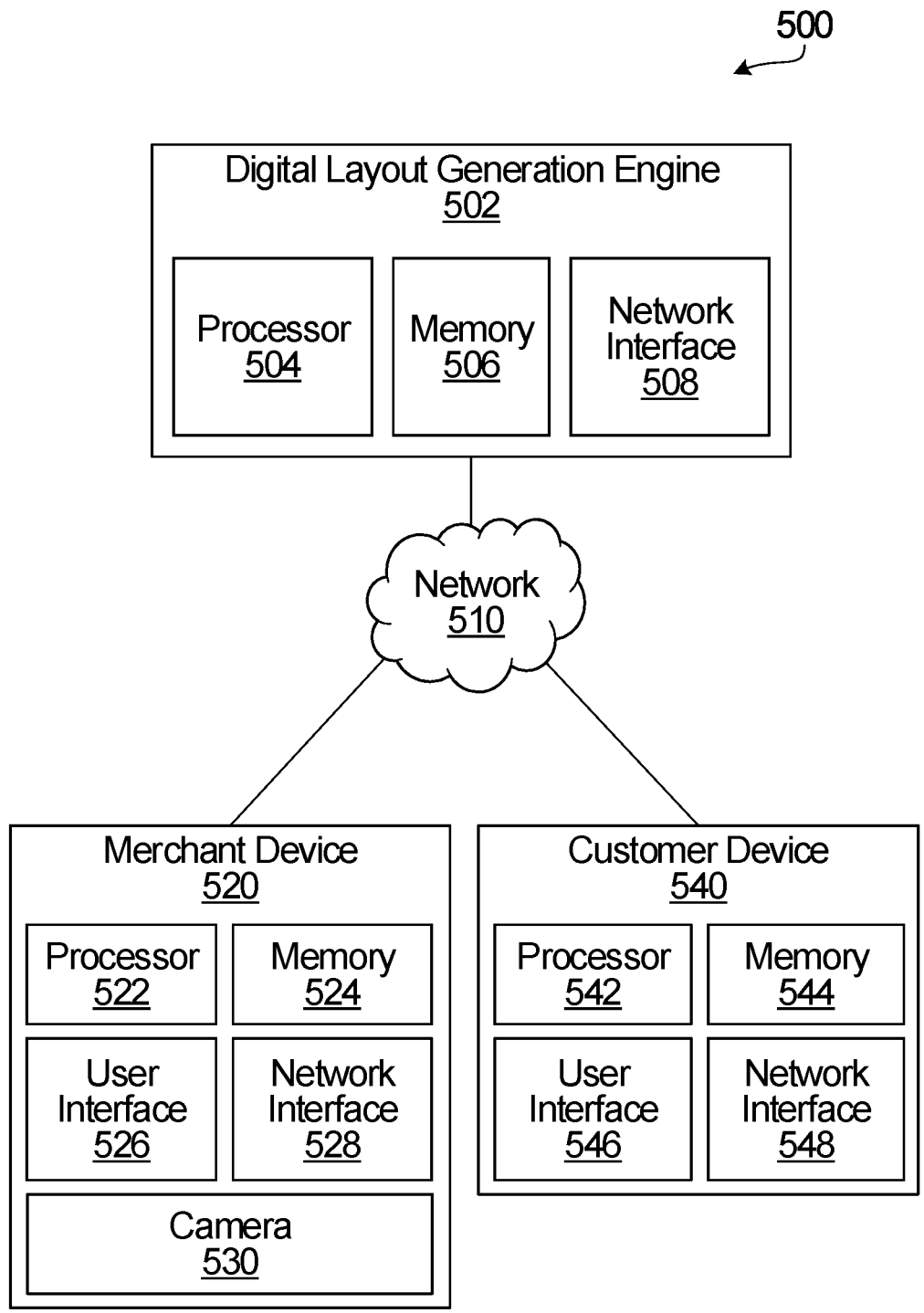
FIG. 5 is a block diagram illustrating a system for generating and displaying digital layouts, according to one embodiment.

FIG. 5 is a block diagram illustrating an example system 500 for generating and displaying digital layouts. The system 500 includes a digital layout generation engine 502, a network 510, a merchant device 520 and a customer device 540.

The digital layout generation engine 502 supports the generation of digital layouts, including digital layouts with feature-based formatting. The location of the digital layout generation engine 502 is implementation specific. In some implementations, the digital layout generation engine 502 is provided at least in part by an e-commerce platform, either as a core function of the e-commerce platform or as an application supported by the e-commerce platform. For example, the digital layout generation engine 502 could be the digital layout generation engine 300 of FIG. 3. In some implementations, the digital layout generation engine 502 is implemented as a stand-alone component or service that is external to the e-commerce platform or that is implemented at least in part by a user device such as a merchant device. Other implementations of the digital layout generation engine 502 are also contemplated. While the digital layout generation engine 502 is shown as a single component, the digital layout generation engine 502 could instead be provided by multiple different components that are in communication via the network 510, for example.

The digital layout generation engine 502 includes a processor 504, memory 506 and a network interface 508. The processor 504 may be implemented by one or more processors that execute instructions stored in the memory 506. These instructions could implement any method described herein. Alternatively, some or all of the processor 504 may be implemented using dedicated circuitry, such as an application specific integrated circuit (ASIC), a graphics processing unit (GPU) or a programmed field programmable gate array (FPGA).

The network interface 508 is provided for communication over the network 510. The structure of the network interface 508 is implementation specific. For example, the network interface 508 may include a network interface card (NIC), a computer port (e.g., a physical outlet to which a plug or cable connects), and/or a network socket.

The merchant device 520 is an example of a user device. The merchant device 520 may be a mobile phone, tablet, laptop, or computer owned and/or used by a merchant. The merchant device 520 includes a processor 522, memory 524, user interface 526, network interface 528 and camera 530. An example of a user interface is a display screen (which may be a touch screen), a keyboard, and/or a mouse. The network interface 528 is provided for communicating over the network 510. The structure of the network interface 528 will depend on how the merchant device 520 interfaces with the network 510. For example, if the merchant device 520 is a mobile phone or tablet, the network interface 528 may include a transmitter/receiver with an antenna to send and receive wireless transmissions to/from the network 510. If the merchant device is a personal computer connected to the network with a network cable, the network interface 528 may include, for example, a NIC, a computer port, and/or a network socket. The processor 522 directly performs or instructs all of the operations performed by the merchant device 520. Examples of these operations include processing user inputs received from the user interface 526, preparing information for transmission over the network 510, processing data received over the network 510, and instructing a display screen to display information. The processor 522 may be implemented by one or more processors that execute instructions stored in the memory 524. Alternatively, some or all of the processor 522 may be implemented using dedicated circuitry, such as an ASIC, a GPU, or a programmed FPGA.

The camera 530 is provided to capture images in the form of photographs and/or videos, which can be stored in the memory 524. Although the camera 530 is shown as a component of the merchant device 520, the camera could instead be implemented separately from the merchant device and communicate with the merchant device via wired or wireless connections, for example.

The customer device 540 is another example of a user device. The customer device 540 may be a mobile phone, tablet, laptop or computer owned and/or used by a customer. The customer device 540 includes a processor 542, memory 544, user interface 546 and network interface 548. The network interface 548 is provided for communicating over the network 510. The structure of the network interface 548 will depend on how the customer device 540 interfaces with the network 510. For example, if the customer device 540 is a mobile phone or tablet, the network interface 548 may include a transmitter/receiver with an antenna to send and receive wireless transmissions to/from the network 510. If the merchant device is a personal computer connected to the network with a network cable, the network interface 548 may include, for example, a NIC, a computer port, and/or a network socket. The processor 542 directly performs or instructs all of the operations performed by the customer device 540. Examples of these operations include processing user inputs received from the user interface 546, preparing information for transmission over the network 510, processing data received over the network 510, and instructing a display screen to display information. The processor 542 may be implemented by one or more processors that execute instructions stored in the memory 544. Alternatively, some or all of the processor 542 may be implemented using dedicated circuitry, such as an ASIC, a GPU, or a programmed FPGA.

In FIG. 5, one customer device and one merchant device are shown by way of example. In general, more than one customer device and/or merchant device may be in communication with the digital layout generation engine 502.

As noted above, the system 500 can be used to generate digital layouts for merchants and other users. An example method for generating digital layouts is described below with reference to FIG. 6, which is a flow diagram illustrating a method 600 according to an embodiment. The method 600 will be described as being performed by the digital scene generation engine 502 of FIG. 5. However, other implementations are also contemplated. For example, the method 600 could be performed in whole or in part on the merchant device 520.

Step 602 includes receiving a plurality of features for a digital layout using the processor 504. Each of the plurality of features corresponds to a respective section of a plurality of sections in the digital layout. In other words, at least one feature for each of the plurality of sections is received in step 602. The plurality of features is stored in memory, such as the memory 506, for example.

The types of features that are received at step 602 are not limited herein. For example, each of the plurality of features can include content and/or an appearance. In some implementations, an indication of one or more background color(s) for a section of the digital layout is received in step 602. In some implementations, text to be included in a section of the digital layout is received in step 602. Receiving text in step 602 could include receiving any or all of the following features:
  the words in the text;
  a font for the text;
  a font size for the text;
  a text color;
  properties of the font (for example, bolded, italicized and/or underlined);
  a line spacing; and
  an alignment (for example, centered, left aligned, right aligned or justified).

In some implementations, an action element for a section of the digital layout is received in step 602. Receiving an action element in step 602 could include receiving any or all of the following features:
  the size and/or shape of the action element;
  the alignment of the action element;
  text or an image for the action element;
  a color for the action element;
  a function that occurs upon the selection of the action element; and
  in the case of action elements that act as links, a webpage address that the link is directed to.

In some implementations, an image for a section of the digital layout is received in step 602. Receiving an image in step 602 could include receiving any or all of the following features:
  the image;
  the size of the image; and
  an alignment of the image.

In some implementations of step 602, at least some of the plurality of features are provided by a user, such as a merchant using the merchant device 520. A feature could be provided by transmitting the feature from the merchant device 520 to the digital layout generation engine 502 via the network interface 508. In an example, an image could be captured by the camera 530 on the merchant device 520 and transmitted to the digital layout generation engine 502. In another example, text could be generated using the user interface 526 and transmitted to the digital layout generation engine 502.

In some implementations of step 602, at least some of the plurality of features are selected by a user from a database of features. For example, using the merchant device 520, a merchant can choose a feature from a set of pre-defined or default features stored in the memory 506. The pre-defined features could include a variety of different images, colors, fonts and/or font sizes that can be selected for use in a digital layout. In some cases, the merchant device 520 can send a message to the digital layout generation engine 502 that selects a pre-defined feature and defines how this feature is to be implemented in a digital layout. In some cases, entire sections having one or more features may be pre-defined in the memory 506. By selecting a pre-defined section, a merchant can add the entire section to a digital layout.

In step 602, the processor 504 could also receive an intended order or arrangement of the plurality of sections in the digital layout. For example, the plurality of features received in step 602 could be received in the form of a data structure identifying the plurality of sections, the features in each section, and the arrangement of each section. Non-limiting examples of such data structures include lists, arrays (of any dimension) and data trees.

In general, the digital layout can include any number of sections, and each of the sections can include any number of features. All of the features for the digital layout may be received in step 602; however, this might not always be the case. In other words, the digital layout is in no way limited to the plurality of features received in step 602 or to the corresponding plurality of sections. In some implementations, only some of the features for the digital layout are received in step 602. For example, the method 600 could also include receiving one or more further feature(s) for the digital layout in addition to the plurality of features received in step 602. At least one section in the plurality of sections may have multiple corresponding features. In some implementations, step 602 actually includes multiple receiving steps, where the plurality of features is received incrementally.

Step 604 includes the processor detecting an association between a first section and a second section of the digital layout based on the features received in step 602. This association could also be considered a relationship or a similarity between the two sections. An association between two sections of a digital layout could be detected in a number of different ways. In some cases, step 604 includes a search for related features in different sections of the digital layout that are indicative of an association. Non-limiting examples of two sections having related features include:

Two sections having the same background color.

Two sections having the same font, font size, text color and/or text alignment. However, this might only constitute a related feature if other sections have different fonts, font sizes, text colors and/or text alignments.

Two sections having text that include similar keywords. In some cases, at least some of the text could be part of an action element or an image, for example.

One section having text and another section having an action element that relates to keywords in the text. As an example, the action element could be a link to a webpage that includes the same keywords as the text. As another example, one or more of the keywords may be part of the URL of the website link (e.g., present in the domain or subdomain of the URL associated with the action element).

One section having an image and another section having text that relates to the image. Determining that the text relates to the image could be based on a comparison between one or more keywords in the text and the file name, title and/or metadata or attributes of the image such keywords, topic, theme or category associated with the image content or as may be determined by image processing, for example.

Two sections having similar action elements. For example, multiple sections having similar sized, shaped and/or colored buttons may be an indication that the sections are related.

A section having metadata that relates to metadata or content in another section. For example, an image in a section could have associated geographical identification metadata that indicates the image was taken in a location related to content in another section.

Two sections being generated by a merchant in close succession or even simultaneously. Related sections may be coded or generated by a merchant at the same time, whereas unrelated sections might be generated at different times. Information pertaining to when a section is generated could be stored as metadata.

Two sections that are not divided by a break section. Examples of break sections are provided above.

Two sections that follow a pre-defined design structure. An example of a pre-defined design structure is a title, followed by text, followed by a website link.

An association might be more likely between adjacent sections, but associations are in no way limited to adjacent sections. Non-adjacent sections (i.e., sections that are separated by at least one other section) could have related features that are indicative of an association.

In some implementations, the step 604 includes: (i) comparing a first feature of the first section to a second feature of the second section; and (ii) determining, based on the comparison, the association between the first section and the second section. As noted above, the first and second features can include content (for example, text, an image (or related attributes) or an action element) or an appearance (for example, a background color or a font). If the first feature includes first content and the second feature includes second content, then step 604 can include determining that the first content is related to the second content. Alternatively, if the first feature includes a first appearance and the second feature includes a second appearance, then step 604 can include determining that the first appearance is related to the second appearance.

In some implementations, related features in different sections could be organized and stored in a data structure. Examples of data structures are provided above.

In some implementations, step 604 might require that multiple related features be found in two sections before it is concluded that there is an association between the two sections. For example, step 604 might search for relationships in both the content and the appearance of two sections. If there are no relationships in either the content or the appearance, then it is determined that the two sections are not associated.

In some cases, an association between more than two sections could be detected in step 604. These sections may or may not be grouped together in the email (i.e., be arranged one after another). An association between more than two sections could be detected when one or more related features exist in all of the sections. However, this might not always be the case. In some cases, two non-adjacent sections could have a related feature, where the two non-adjacent sections are separated by a third section that does not have the same related feature. It may be inferred that the third section is also associated with the two non-adjacent sections based on the nature of the related feature, for example.

By way of example, consider that case in which: (i) a first section includes a text with certain keywords; (ii) a second section includes an image; and (iii) a third section includes an action element for accessing a website. The sections are arranged in that order. Keywords in the text of the first section match keywords found in the webpage linked to by the third section, which is an example of a related feature. As such, an association between the first section and the third section is determined. Given the nature of this related feature, it may be inferred that the second section is also associated with the first section and the third section. To further specify the example, consider the case in which: (i) the text in the first section describes a product; (ii) the image in the second section is an image of the product; and (iii) the link in the third section is a link to a website to purchase the product. While all three of these sections are related, it might be difficult to determine that the image in the second section is in fact an image of the product. Therefore, the association between the first section, the second section and the third section is instead inferred from the related text in the first section and the third section, and from the order of the sections in the digital layout.

In some implementations, step 604 determines a degree of association between two or more sections. This degree of association represents a quantitative assessment of the related features in two or more sections. In an example, a different degree of association could be determined for different types of related features between two sections. In another example, a different degree of association could be used for different numbers of related features between two sections. Sections with a high degree of association have one or more related features that indicate a strong relationship between the sections, whereas sections that have a moderate or low degree of association have fewer related features or related features that indicate only a weak relationship between the sections.

Step 606 is an optional step that includes detecting, using the processor 504, no association between a third section and a fourth section of the digital layout. In some implementations, step 606 includes searching for any related features in the third section and the fourth section. If this search fails to detect any related features, then no association has been detected. Alternatively, there might be other ways to detect that two sections are unrelated. In some implementations, certain types of sections could be designated as sections that are never associated with any other sections. For example, header sections, title sections, break sections and/or concluding sections could be designated as sections that are not associated with any other sections. In step 606, if the processor 504 determines that a section is of a type that is not associated with any other sections, then the processor 504 would not search for any association between this section and other sections.

It should be noted that more than one instance of steps 604, 606 may be performed in the method 600. This is illustrated using cyclical arrows in FIG. 6. By way of example, a second instance of step 604 may include detecting, based on the plurality of features received at step 602, a second association between other sections in the plurality of sections.

Figure 6:
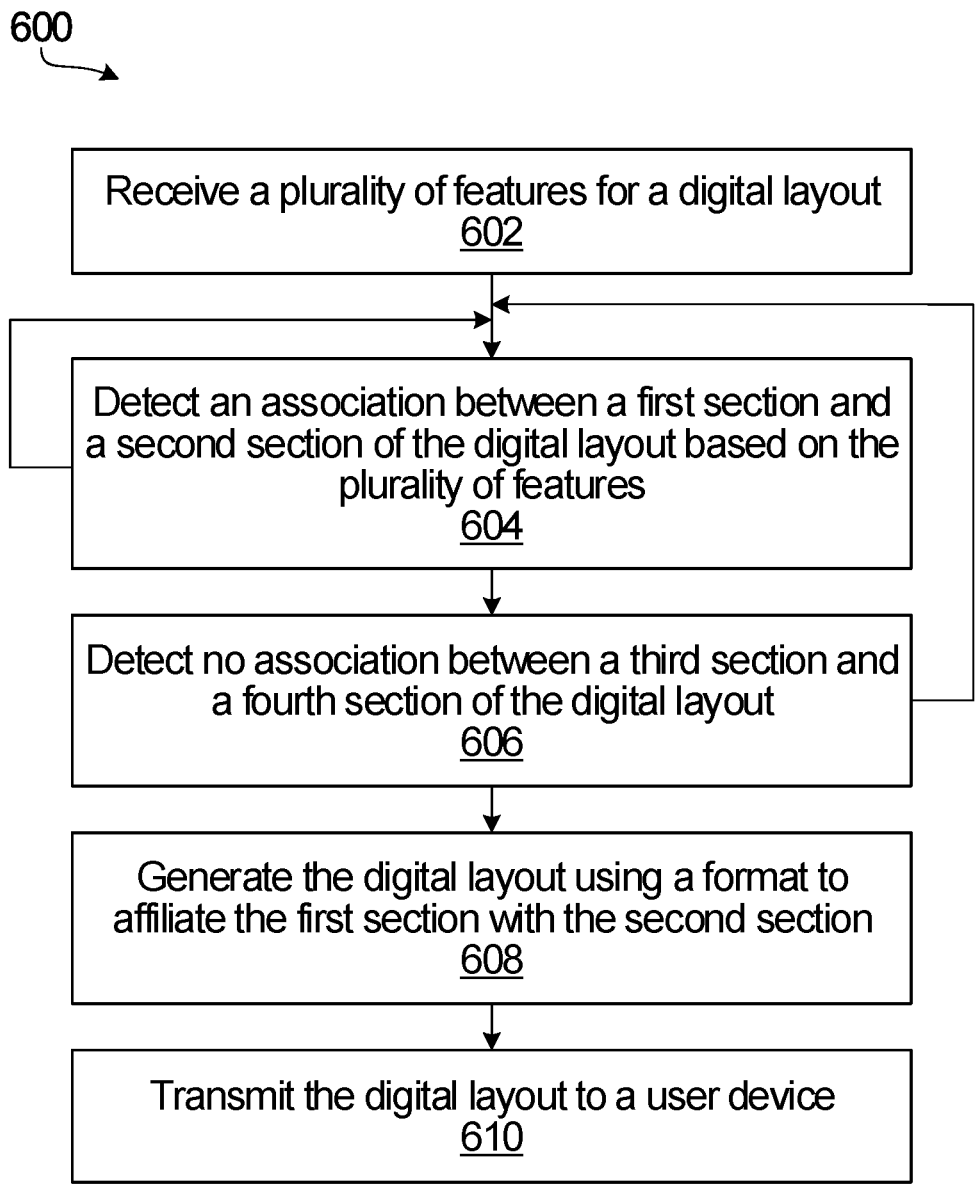
FIG. 6 is a flow diagram illustrating a method for generating digital layouts, according to one embodiment.

The order of steps 604, 606 is shown by way of example in FIG. 6. In some implementations, these steps could be performed concurrently or simultaneously. For example, a comprehensive search for related features in a plurality of sections could detect both associated sections and non-associated sections.

Step 608 includes generating, using the processor 504, the digital layout using a format to affiliate any associated sections. For example, after the association between the first section and the second section in the plurality of sections is detected in step 604, the digital layout is generated using a format to affiliate the first section with the second section. Affiliating the first section with the second section will more clearly convey to a viewer that the two sections are related.

The format used in step 608 can integrate sections that are related and provide context for one another, while differentiating sections that are unrelated. In some cases, this may reduce customer confusion and reduce the number of customer mistakes in taking appropriate actions. At least a portion of the format used in step 608 is determined in response to detecting an association between two or more sections in step 604. Thus, the format is not simply a pre-defined format but is instead a format that is dynamically determined and is specific to the sections in the digital layout.

Determining the format of the digital layout can include setting or configuring any of a number of parameters for the format. In some cases, determining the format includes modifying or adjusting a parameter of a pre-defined or default format to obtain a new format that is specific to the digital layout. This pre-defined format might correspond to a template for the digital layout. Non-limiting examples of parameters for a format include:

The spacing between adjacent sections in the email. For example, the padding that is used between each pair of adjacent sections can be independently set.
The line height for text in a section. This can also affect the spacing between text in adjacent sections.
The background color of a section.
The color of an action element in a section.
The font, font size and color of text in a section.

In some implementations, a format can affiliate two adjacent sections by reducing the spacing between the sections. In an example, when an association between a first section and a second section is detected in step 604, and the first section is adjacent to the second section in the digital layout, then step 608 includes generating the digital layout using a format to reduce the spacing between the first section and the second section. This reduction in spacing conveys the association between the first section and the second section to a viewer of the digital layout. In some cases, the spacing between the first section and the second section is reduced compared to a pre-defined or default spacing. For example, a pre-defined padding value can be dynamically altered or modified to improve the appeal and effectiveness of the digital layout compared to a digital layout that strictly adheres to the template.

In some cases, step 608 can generate the digital layout using a format to affiliate more than two sections. For example, step 604 could include determining that, in the digital layout, a third section in the plurality of sections is interposed between the first section and the second section mentioned above. Thus, as noted above, it can be determined at step 604 that the association is between the first section, the second section and the third section. Here, step 608 includes generating the digital layout using the format to affiliate the first section and the second section with the third section.

Consider once again the example in which: (i) a first section includes text with certain key words; (ii) a second section includes an image; and (iii) a third section includes a link to a website. As outlined above, an association is detected between the first section, the second section and the third section. In response to detecting this association, the format of the email could affiliate the first section with the second section and with the third section. For example, the spacing between the first section, the second section and the third section could be reduced compared to a pre-defined spacing.

It should be noted that reducing spacing between associated sections is only one example of using a format to affiliate the two sections in a digital layout. Other ways to affiliate associated sections are also contemplated. For example, associated sections could be modified to have the same background color and/or fonts.

In some implementations, step 606 detects no association between two sections in the digital layout, and step 608 generates the digital layout using a format to distinguish these two sections. To distinguish two unrelated sections in a digital layout, the spacing between the sections could be increased. The sections could also or instead be modified to have different background colors and/or different fonts. This can convey that there is no association between the two sections in the email. In an example, there is no detected association between a third section and a fourth section of the digital layout, and the third section is adjacent to the fourth section. Here, step 608 can include generating the digital layout using a format to increase the spacing between the third section and the fourth section compared to a pre-defined spacing, for example.

In general, for two sections in a digital layout, step 608 could include using a pre-defined or default spacing between the sections, using a reduced spacing between the sections compared to the pre-defined spacing, or using an increased spacing between the sections compared to the pre-defined spacing. In some cases, the pre-defined spacing is the largest spacing between two sections in a format, and smaller spacings are used to affiliate two sections. In other cases, the pre-defined spacing is the smallest spacing between two sections in a format and is used to affiliate two sections, whereas larger spacings are used for non-associated sections. In some embodiments, a pre-defined spacing is a default spacing applied between sections in the absence of an association between the sections.

In some implementations, different spacings are used for different degrees of association between two or more sections. By way of example, a spacing of 80 px could be used between sections with no association, a spacing of 40 px could be used between sections with a low degree of association, a spacing of 20 px could be used between sections with a moderate degree of association, and a spacing of 10 px could be used between sections with a high degree of association. In some cases, the spacing between two sections is continuously variable in a digital layout format.

The format used to generate the digital layout in step 608 could be based on other factors in addition to any associated and/or non-associated sections determined at steps 604, 606. In some embodiments, step 608 includes the reduction, removal or accounting of any borders that appear around an image in a section of the digital layout. These borders might appear as white space between otherwise colored backgrounds, which can be visually unappealing. If a section includes an image, any padding for the section can be removed to ensure that the padding does not appear as a border around the image. If the original image includes a border, this border can be automatically detected and removed before the image is added to the digital layout. Alternatively, the border can be taken into account when determining the padding between two sections.

In some embodiments, step 608 includes automatically determining suitable line heights for adjacent lines of text with different font sizes, which can be important for clarity and readability. In general, when switching between different font sizes, line height should also be adjusted. However, for at least the first line of the new font size, the adjustment in line height should not be proportional to the change in font size. For example, if font size is reduced by 50%, line height might only be reduced by 25% to ensure suitable readability. A relationship could be defined to help select an appropriate change in line height for a corresponding change in font size. This relationship could be used to automatically set an appropriate line height when a user changes the font size. This relationship could be applied to text in different sections of a digital layout, for example.

Step 610 is an optional step that includes the processor 504 transmitting the digital layout generated in step 608 to a user device, such as the merchant device 520 and/or the customer device 540. The digital layout could be for an email or a webpage that is configured to be displayed on a user interface.

Examples of Computer-Generated Digital Layouts with Feature-Based Formatting

Figure 7:
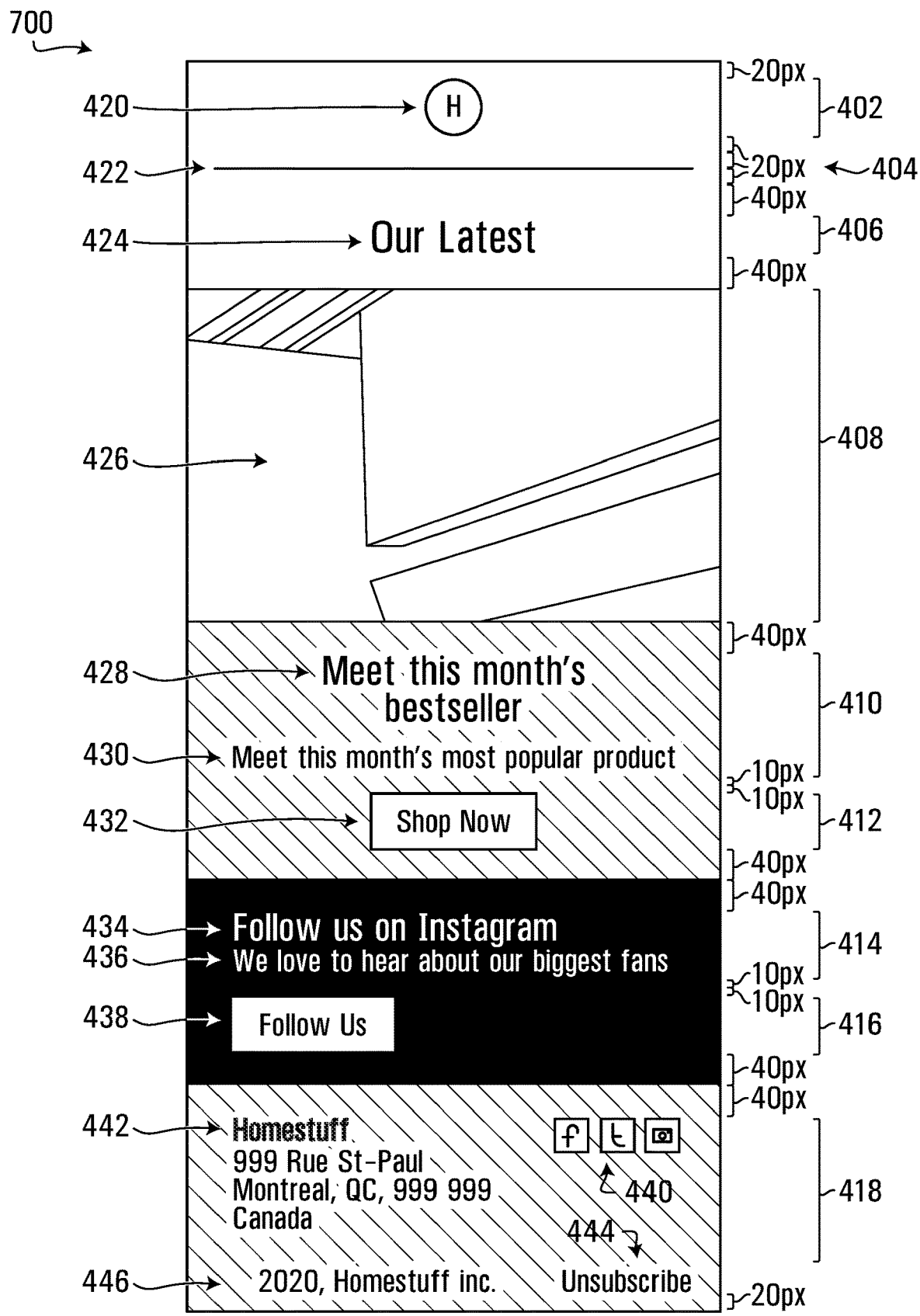
FIG. 7 illustrates an example email that is generated using feature-based formatting.

FIG. 7 illustrates an example email 700 that is generated using feature-based formatting. The email 700 includes the same sections 402, 404, 406, 408, 410, 412, 414, 416, 418 as the email 400 of FIG. 4; however, the email 700 uses feature-based formatting, rather than pre-defined formatting from an email template. For example, the email 700 may have been formatted using the method 600 of FIG. 6.

Any or all of the content 420, 422, 424, 426, 428, 430, 432, 434, 436, 438, 440, 442, 444, 446 could be received in step 602 of the method 600. The order of the sections 402, 404, 406, 408, 410, 412, 414, 416, 418 could also be received in step 602. In some implementations, a merchant selects or provides the content 420, 422, 424, 426, 428, 430, 432, 434, 436, 438, 440, 442, 444, 446. The merchant can also select or provide the background color for each of the sections 402, 404, 406, 408, 410, 412, 414, 416, 418. For example, content and background colors could be transmitted from a merchant device to a digital layout generation engine that generates the email 700. At least some of the content 420, 422, 424, 426, 428, 430, 432, 434, 436, 438, 440, 442, 444, 446 and/or background colors of the sections 402, 404, 406, 408, 410, 412, 414, 416, 418 could be selected from a set of pre-defined features that are stored at the digital layout generation engine. For example, the content 422 could be a pre-defined line that is available in the digital layout generation engine. Section formats can also be pre-defined and stored at the digital layout generation engine. For example, the section 418 could correspond to a pre-defined concluding section format. The merchant could select this format for the section 418, and then provide the content 440, 442, 444, 446 to include in the section 418.

As noted above in the discussion of FIG. 4, an association exists between the sections 410, 412, and another association exists between the sections 414, 416. These associations could have been detected at step 604 of the method 600, for example. No other associations between the sections 402, 404, 406, 408, 410, 412, 414, 416, 418 have been detected. In some cases, step 606 of the method 600 could actively detect no association between the sections 412, 414, and also detect no association between the sections 416, 418.

The email 700 is generated using a format that is based on the associations detected in the sections 402, 404, 406, 408, 410, 412, 414, 416, 418. Specifically, the format of the email 700 is configured to affiliate the associated sections. In some cases, the format of the email 700 is also configured to distinguish the non-associated sections. To affiliate associated sections and distinguish non-associated sections in the email 700, the pre-defined padding of 20 px at the top and bottom of each of the sections 402, 404, 406, 408, 410, 412, 414, 416, 418 is dynamically adjusted. The pre-defined padding is halved to 10 px to affiliate two sections, and the pre-defined padding is doubled to 40 px to distinguish between two sections. The email 700 could have been generated in step 608 of the method 600, for example.

The padding at the top of the section 402 is the pre-defined padding of 20 px. The pre-defined padding is used here because the section 402 is the first section in the email 700, and therefore there is no need to adjust the padding at the top of the section 402 to affiliate/distinguish the section 402 with/from other sections. The pre-defined padding of 20 px is also used at the bottom of section 418 for similar reasons.

The pre-defined padding of 20 px is also implemented at the bottom of section 402, the top of section 404 and the bottom of section 404. This might be the case because section 402 is a header section and section 404 is a break section, and in this example, header sections and break sections are not associated with any other sections. Furthermore, the format of the email 700 does not distinguish header sections and break sections from other sections. Therefore, even though the sections 402, 404 are not affiliated with any other sections, the pre-defined padding value is used for these sections. In other words, the format of the email 700 is pre-configured to not affiliate or distinguish header sections and break sections with/from other sections.

An increased padding value of 40 px is used at the top and the bottom of section 406. This might be the case because there is not a detected association between section 406 and any other sections in the email 700, and therefore the increased padding value is used to distinguish the section 406 from the adjacent sections 404, 408. Alternatively, this might be the case because section 406 is a title section and the format of the email 700 is pre-configured to distinguish title sections in the email 700.

A padding value of 0 px is used at the top and the bottom of section 408. This might be the case because section 408 is an image section. The removal of padding from an image section can be performed to avoid the formation of white space between an image and an adjacent section. For example, the white space shown between the sections 408, 410 in the email 400 is avoided in the email 700. As noted above, this white space can result in visually unappealing borders being formed around an image.

An increased padding value of 40 px is used at the top of the section 410. This increased padding value helps distinguish the section 410 from the unrelated section 408.

A decreased padding value of 10 px is used at the bottom of the section 410 and the top of the section 412. Thus, the total spacing between the sections 410, 412 is reduced to 20 px. The reduced spacing is used to affiliate the section 410 with the section 412 because an association between the sections 410, 412 was detected. In effect, this better conveys to a reader of the email 700 that the content 428, 430, 432 is related. Thus, it is clearer that the action element in the content 432 is to access the bestselling and most popular products.

Similarly, a decreased padding value of 10 px is used at the bottom of the section 414 and the top of the section 416 to create a reduced spacing of 20 px between the sections 414, 416. The reduced is used to affiliate the section 414 with the section 416 to better convey to a reader of the email 700 that the content 434, 436, 438 is related.

An increased padding value of 40 px is used at the bottom of section 412, the top of section 414, the bottom of section 416 and the top of section 418. This results in a larger spacing of 40 px to between the sections 412, 414 and between the sections 416, 418. Thus, a reader of the email 700 is more likely to recognize a distinction between the sections 412, 414 and a distinction between the sections 416, 418.

Although only three padding values (10 px, 20 px and 40 px) are used in the email 700, this is only an example. In general, a digital layout could include any number of padding values.

The email 700 reflects the improved functionality of the computer-implemented methods and systems described herein. While conventional methods for generating digital layouts are unable to detect associations between sections in a digital layout, methods disclosed herein are able to detect and use associations between sections to generate digital layouts having improved comprehensibility.

Figure 8:
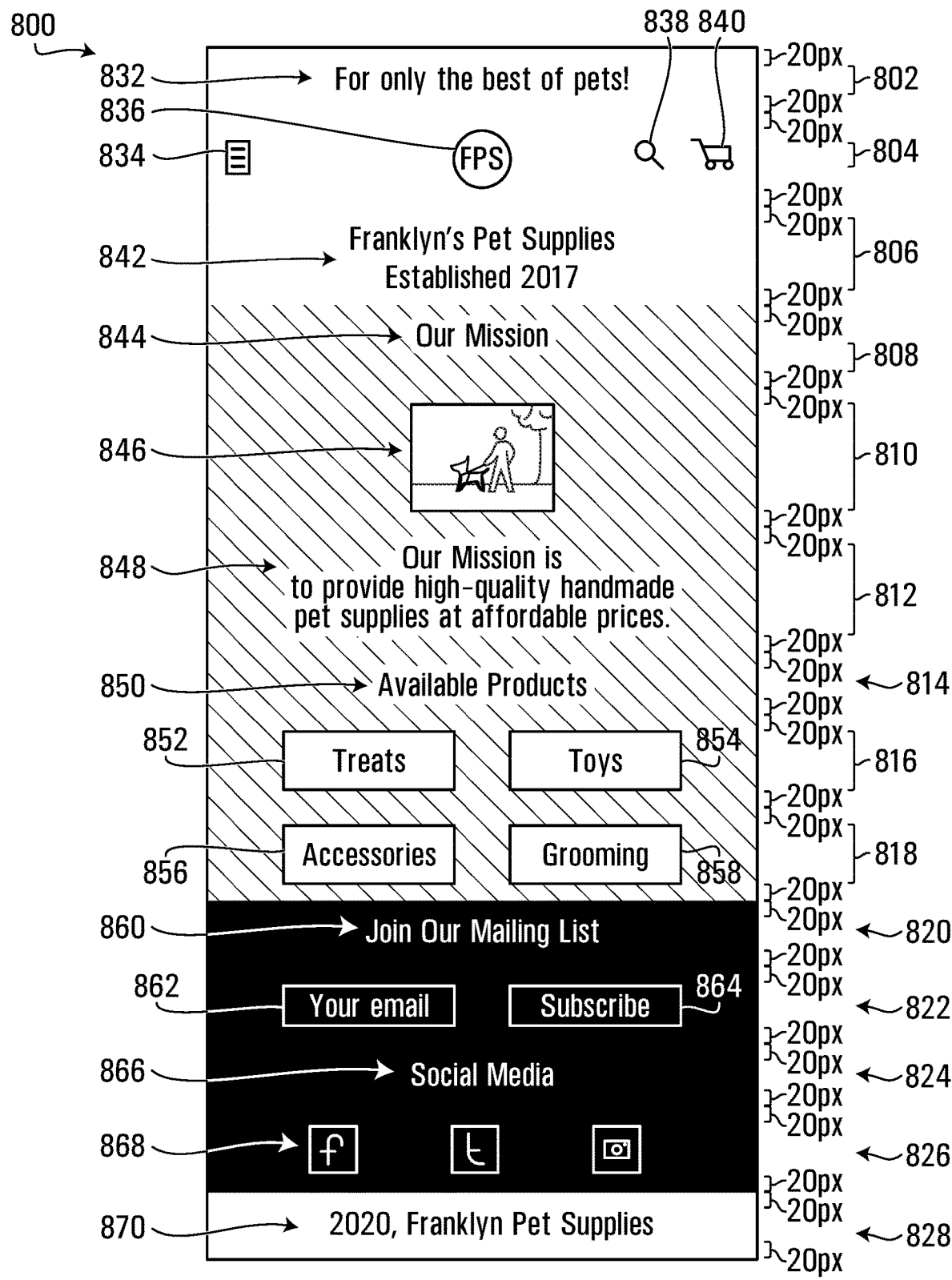
FIG. 8 illustrates an example webpage that is generated using a webpage template.
Figure 9:
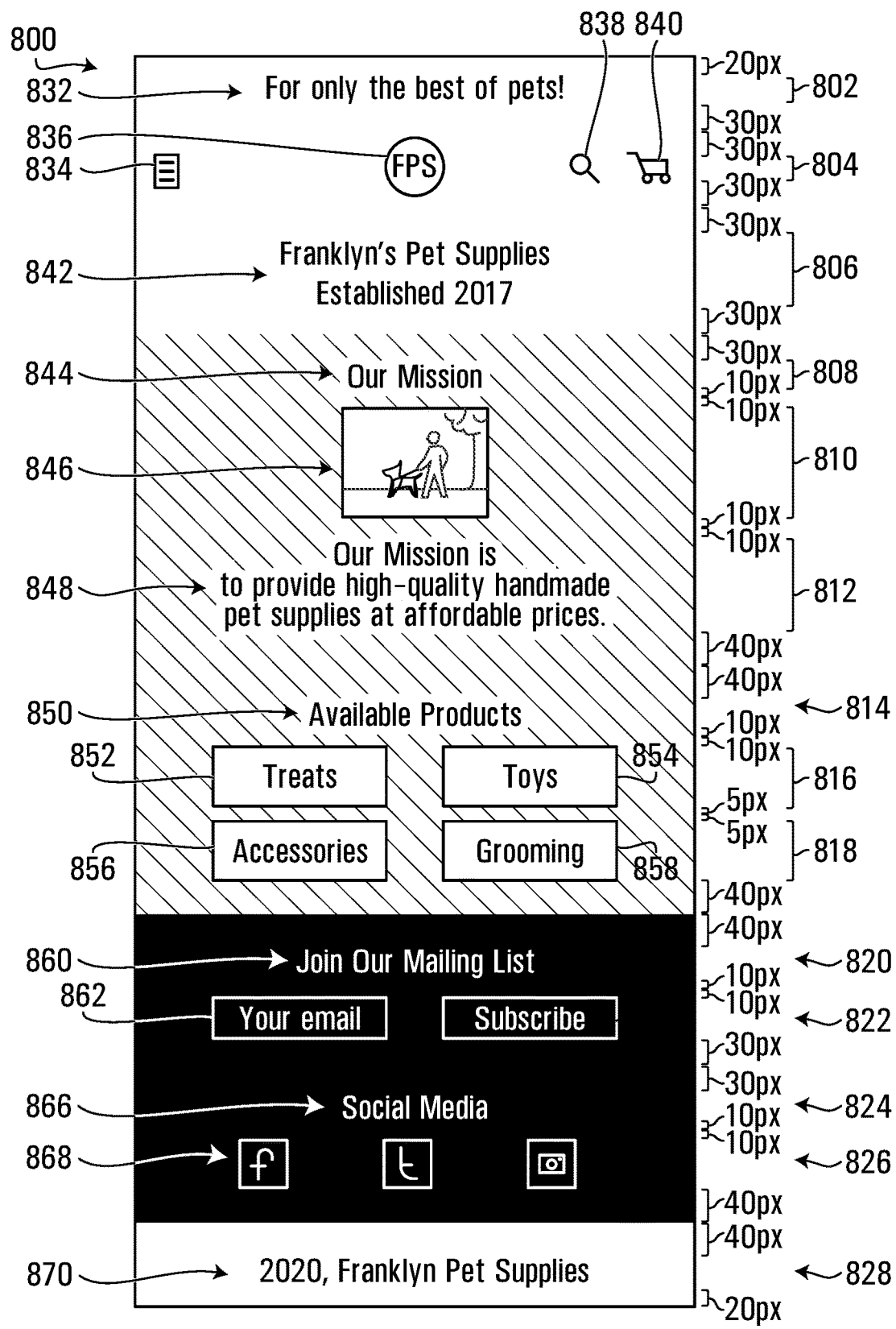
FIG. 9 illustrates an example webpage that is generated using feature-based formatting.

In addition to emails, feature-based formatting for webpages is also contemplated. FIG. 8 illustrates an example webpage 800 that is generated using a webpage template, and FIG. 9 illustrates an example webpage 900 that is generated using feature-based formatting. The webpages 800, 900 are example webpages for a merchant's online store. Each of the webpages 800, 900 include the same sections 802, 804, 806, 808, 810, 812, 814, 816, 818, 820, 822, 824, 826, 828.

The section 802 is a header section that includes content 832 and a white background color. The content 832 includes text that recites a merchant's slogan.

The section 804 includes content 834, 836, 838, 840 and a white background color. The content 834 includes an action element that allows a user to access a menu for the merchant's online store, the content 836 is an image of the merchant's logo, the content 838 is an action element that allows a user to search the merchant's online store, and the content 840 is an action element that allows a user to access their shopping cart. In some implementations, the section 804 could actually be four sections arranged side-by-side, where the four columns include the content 834, 836, 838, 840, respectively.

The section 806 includes content 842 and a white background color. The content 842 includes centered text that provides the name of the merchant's store and the date of establishment.

The section 808 includes content 844, the section 810 includes content 846 and the section 812 includes content 848. Each of the sections 808, 810, 812 has a white background color. The content 844 includes centered text that provides a heading, the content 846 includes a picture, and the content 848 includes additional centered text. The content 844 and the content 848 are an example of related features, as the text in the content 844 provides a heading for the text in the content 848. These related features could have been detected using text analysis and the determination that the content 844 and 848 both include the keyword "mission". The detection of related features in the content 844, 848 leads to a detection of an association between the corresponding sections 808, 810. Because the section 810 is interposed between the sections 808, 812, it is inferred that the section 810 is also associated with the sections 808, 812.

The white background that is shared by the sections 802, 804, 806, 808, 810, 812 is also an example of a related feature that indicates an association between the sections 802, 804, 806, 808, 810, 812.

The section 814 includes content 850, the section 816 includes content 852, 854, and the section 818 includes content 856, 858. Each of the sections 808, 810, 812 has a hatched background color. The content 850 includes text that provides a heading for available products. The content 852, 854, 856, 858 each includes a respective action element associated with a particular category of product. These action elements are shown as buttons that link a user to other webpages of the merchant's online store where products can be viewed and purchased. The actions elements also include text that states the categories of products. Multiple related features are exhibited by the content 852, 854, 856, 858. One related feature is that the action elements in the content 852, 854, 856, 858 each have a similar size and shape. Another related feature is that the text in the content 852, 854, 856, 858 all relates to types of products. A further related feature is that each of the action elements provides a link to a product webpage on the merchant's online store. Based on any or all of these related features, an association can be detected between the sections 816, 818. Furthermore, the content 850 in section 814 includes the keyword "product", which relates to the both the text of the action elements in the content 852, 854, 856, 858 and to the webpages linked to by the content 852, 854, 856, 858. Thus, the section 814 is also associated with the sections 816, 818. The hatched background that is shared by the sections 814, 816, 818 is another example of a related feature that further indicates the association between the sections 814, 816, 818.

The section 820 includes content 860 and the section 822 includes content 862, 864. Both of the sections 820, 822 have a black background color. The content 860 includes text providing a heading, the content 862 includes a text box for a user to enter their email address, and the content 864 includes an action element that allows a user to subscribe to an email list. The content 860, 862, 864 is all related as it corresponds to email communications. This relationship could be detected based on the word "email" in the content 860, 862 and the word "subscribe" in the content 864. As such, the sections 820, 822 are associated with each other.

The section 824 includes content 866 and the section 826 includes content 868. Both of the sections 824, 826 have a black background color. The content 866 includes text providing a heading, and the content 868 includes multiple actions items that link to social media platforms. The content 866, 868 is all related as it corresponds to social media. This relationship could be determined by recognising that the content 868 links to social media platforms, which matches keywords in the content 866. As such, the sections 824, 826 are associated with each other.

The sections 820, 822, 824, 826 all have a black background color, which constitutes a related feature and could indicate an association between the sections 820, 822, 824, 826.

The concluding section 828 includes content 870 and a white background color. The content 870 is text relating to the merchant.

The webpage 800 of FIG. 8 is generated using a format that does not distinguish between associated and non-associated sections. A pre-defined padding value of 20 px is implemented, and therefore the spacing between each set of adjacent sections is fixed at 40 px. This limitation of the webpage 800 is undesirable, as customers might not be able to appreciate relationships within content of the webpage 800, and therefore might struggle to efficiently navigate the webpage 800.

In contrast, the webpage 900 of FIG. 9 is generated using a format to affiliate associated sections. For example, the webpage 900 could be generated using the method 600 of FIG. 6. The features (for example, the content and background colors) of the sections 802, 804, 806, 808, 810, 812, 814, 816, 818, 820, 822, 824, 826, 828 could be received in step 602, associations between the sections 802, 804, 806, 808, 810, 812, 814, 816, 818, 820, 822, 824, 826, 828 could be detected in step 604, and non-associations between the sections 802, 804, 806, 808, 810, 812, 814, 816, 818, 820, 822, 824, 826, 828 could be detected in step 606. The webpage 900 is then generated in step 608.

The webpage 900 is an example of a digital layout with multiple degrees of association between different sections. These degrees of association include: no association (as determined in step 606, for example); a low degree of association; a moderate degree of association; and a high degree of association. The padding that is implemented for each of the sections 802, 804, 806, 808, 810, 812, 814, 816, 818, 820, 822, 824, 826, 828 is determined based on the degree of association between sections.

An example of sections with a moderate degree of association is the sections 808, 810, 812. The related features in the sections 808, 810, 812 include: the word "mission" shared by the content 844, 848, and the white background color. In the illustrated example, two sections that have only one content-based related feature are considered to have a moderate degree of association. In the webpage 900, a padding value of 10 px is used at the bottom of section 808, the top of section 810, the bottom of section 810 and the top of section 812. Thus, compared to the webpage 800, a reduced spacing of 20 px is implemented between the sections 808, 810, 812. Other examples of sections with a moderate degree of association are the sections 814, 816, the sections 820, 822, and the sections 824, 826. The spacing of 20 px is implemented between the sections 814, 816, the sections 820, 822, and the sections 824, 826 to convey these associations.

An example of sections with a high degree of association is the sections 816, 818. As discussed above, the content 852, 854, 856, 858 of the sections 816, 818 includes multiple related features. The sections 816, 818 also share a hatched background color. In the illustrated example, two sections that have multiple content-based related features are considered to have a high degree of association. A relatively small spacing of 10 px between the sections 816, 818 is used to convey this high degree of association. In particular, a padding value of 5 px is used at the bottom of section 816 and the top of section 818.

An example of sections with a low degree of association is the sections 804, 806. The only related feature that is detected between these sections is the white background color. In the illustrated example, two sections that have only appearance-based related features, and no content-based related features, are considered to have a low degree of association. A padding value of 30 px is used at the bottom of the section 804 and at the top of the section 806, which results in spacing of 60 px between the sections 804, 806. Other examples of sections having a low degree of association include the sections 806, 808 and the sections 822, 824.

Sections that have no detected association include the sections 812, 814, the sections 818, 820 and the sections 826, 828. These sections do not have any detected related features. For example, the content and the appearance of these sections do not share any similarities that constitute related features in the webpage 900. A spacing of 80 px, formed from padding values of 40 px, is implemented between the sections 812, 814, the sections 818, 820 and the sections 826, 828 to distinguish these sections.

Conclusion

Although the present invention has been described with reference to specific features and embodiments thereof, various modifications and combinations can be made thereto without departing from the invention. The description and drawings are, accordingly, to be regarded simply as an illustration of some embodiments of the invention as defined by the appended claims, and are contemplated to cover any and all modifications, variations, combinations or equivalents that fall within the scope of the present invention. Therefore, although the present invention and its advantages have been described in detail, various changes, substitutions and alterations can be made herein without departing from the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

Moreover, any module, component, or device exemplified herein that executes instructions may include or otherwise have access to a non-transitory computer/processor readable storage medium or media for storage of information, such as computer/processor readable instructions, data structures, program modules, and/or other data. A non-exhaustive list of examples of non-transitory computer/processor readable storage media includes magnetic cassettes, magnetic tape, magnetic disk storage or other magnetic storage devices, optical disks such as compact disc read-only memory (CD-ROM), digital video discs or digital versatile disc (DVDs), Blu-ray Disc™, or other optical storage, volatile and non-volatile, removable and non-removable media implemented in any method or technology, random-access memory (RAM), read-only memory (ROM), electrically erasable programmable read-only memory (EEPROM), flash memory or other memory technology. Any such non-transitory computer/processor storage media may be part of a device or accessible or connectable thereto. Any application or module herein described may be implemented using computer/processor readable/executable instructions that may be stored or otherwise held by such non-transitory computer/processor readable storage media.

The invention claimed is:

1. A computer-implemented method comprising:
   storing, in memory, a plurality of features corresponding to a plurality of sections for a digital layout to be displayed on a user interface, wherein the plurality of sections have a user-defined arrangement in the digital layout and wherein the plurality of features comprises content and appearances of the plurality of sections;
   detecting, using at least one processor, a plurality of associations in the plurality of sections, the plurality of associations comprising a first association between a first section and a second section in the plurality of sections, and a second association between a third section and a fourth section in the plurality of sections, wherein the detecting is based on relationships in at least one of the content and the appearances of the plurality of sections;
   determining, using the at least one processor, a format that is specific to the plurality of sections, wherein the determining is based on the user-defined arrangement, the first association and the second association; and
   generating, using the at least one processor, the digital layout using the format to: provide the user-defined arrangement of the plurality of sections, affiliate the first section with the second section and affiliate the third section with the fourth section.

2. The computer-implemented method of claim 1, wherein:
   the first section is adjacent to the second section in the user-defined arrangement; and
   generating the digital layout using the format comprises generating the digital layout using the format to reduce the spacing between the first section and the second section compared to a pre-defined spacing.

3. The computer-implemented method of claim 1, further comprising:
   detecting no association between a fifth section and a sixth section in the plurality of sections,
   wherein the fifth section is adjacent to the sixth section in the user-defined arrangement, and generating the digital layout using the format comprises generating the digital layout using the format to increase the spacing between the fifth section and the sixth section compared to a pre-defined spacing.

4. The computer-implemented method of claim 1, wherein detecting the plurality of associations comprises:
   comparing first content of the first section to second content of the second section;
   determining, based on the comparing, that the first content is related to the second content; and
   determining, based on the first content being related to the second content, the first association between the first section and the second section.

5. The computer-implemented method of claim 4, wherein the first content and the second content each comprise at least one of respective text, a respective image and a respective action element.

6. The computer-implemented method of claim 4, wherein:
   the first content comprises text having a keyword;
   the second content comprises an action element for accessing a webpage; and
   determining that the first content is related to the second content comprises determining that the webpage comprises the keyword.

7. The computer-implemented method of claim 4, wherein:
   detecting the plurality of associations further comprises:
   determining that, in the user-defined arrangement, a fifth section in the plurality of sections is interposed between the first section and the second section; and
   determining that the first association is between the first section, the second section and the fifth section; and
   generating the digital layout using the format comprises generating the digital layout using the format to affiliate the first section and the second section with the fifth section.

8. The computer-implemented method of claim 1, wherein detecting the plurality of associations comprises:
   comparing a first appearance of the first section to a second appearance of the second section;
   determining, based on the comparing, that the first appearance is related to the second appearance; and
   determining, based on the first appearance being related to the second appearance, the first association between the first section and the second section.

9. The computer-implemented method of claim 8, wherein the first appearance and the second appearance each comprise at least one of a respective background color and a respective font.

10. The computer-implemented method of claim 1, wherein the digital layout is for an email or a webpage.

11. The computer-implemented method of claim 1, further comprising:
   detecting no association between the second section and the third section in the plurality of sections.

12. The computer-implemented method of claim 1, wherein detecting the plurality of associations is based on relationships in both the content and the appearances of the plurality of sections.

13. A system comprising:
   a memory to store a plurality of features corresponding to a plurality of sections for a digital layout to be displayed on a user interface, wherein the plurality of sections have a user-defined arrangement in the digital layout and wherein the plurality of features comprises content and appearances of the plurality of sections; and
   at least one processor to:
   detect a plurality of associations in the plurality of sections, the plurality of associations comprising a first association between a first section and a second section in the plurality of sections, and a second association between a third section and a fourth section in the plurality of sections, wherein the plurality of associations is based on relationships in at least one of the content and the appearances of the plurality of sections;
   determine, based on the user-defined arrangement, the first association and the second association, a format that is specific to the plurality of sections; and generate the digital layout using the format to: provide the user-defined arrangement of the plurality of sections, affiliate the first section with the second section and affiliate the third section with the fourth section.

14. The system of claim 13, wherein:
the first section is adjacent to the second section in the user-defined arrangement; and
the format reduces the spacing between the first section and the second section compared to a pre-defined spacing.

15. The system of claim 13, wherein the plurality of sections include a fifth section and a sixth section that are adjacent to each other in the user-defined arrangement, and wherein upon no association being detected between the fifth section and the sixth section, the at least one processor is further to:
increase the spacing between the fifth section and the sixth section in the digital layout compared to a pre-defined spacing.

16. The system of claim 13, wherein the at least one processor is further to:
compare first content of the first section to second content of the second section;
determine, based on the comparison, that the first content is related to the second content; and
determine, based on the first content being related to the second content, the first association between the first section and the second section.

17. The system of claim 16, wherein the first content and the second content each comprise at least one of respective text, a respective image and a respective action element.

18. The system of claim 16, wherein:
the first content comprises text having a keyword;
the second content comprises an action element for accessing a webpage; and
the at least one processor is further to determine that webpage comprises the keyword.

19. The system of claim 16, wherein the at least one processor is further to:
determine that, in the user-defined arrangement, a fifth section in the plurality of sections is interposed between the first section and the second section; and
determine that the association is between the first section, the second section and the fifth section,
wherein the format is further to affiliate the first section and the second section with the fifth section.

20. The system of claim 13, wherein the at least one processor is further to:
compare a first appearance of the first section to a second appearance of the second section;
determine, based on the comparison, that the first appearance is related to the second appearance; and
determine, based on the first appearance being related to the second appearance, the first association between the first section and the second section.

21. The system of claim 20, wherein the first appearance and the second appearance each comprise at least one of a respective background color and a respective font.

22. The system of claim 13, wherein the digital layout is for an email or a webpage.

23. The system of claim 13, wherein no association is detected between the second section and the third section in the plurality of sections.

24. The system of claim 13, wherein the plurality of associations is based on relationships in both the content and the appearances of the plurality of sections.

* * * * *